(12) United States Patent
Goto

(10) Patent No.: US 8,031,999 B2
(45) Date of Patent: *Oct. 4, 2011

(54) PHOTONIC BAND-GAP FIBER

(75) Inventor: Ryuichiro Goto, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/554,576

(22) Filed: Sep. 4, 2009

(65) Prior Publication Data

US 2009/0324186 A1 Dec. 31, 2009

Related U.S. Application Data

(63) Continuation of application No. PCT/JP2008/053515, filed on Feb. 28, 2008.

(30) Foreign Application Priority Data

Mar. 5, 2007 (JP) ................................. 2007-054273
Jun. 5, 2007 (JP) ................................. 2007-149180

(51) Int. Cl.
*G02B 6/02* (2006.01)
(52) U.S. Cl. ........ 385/127; 385/123; 385/124; 385/125; 385/126
(58) Field of Classification Search .................. 385/123, 385/124, 125, 126, 127
See application file for complete search history.

(56) References Cited

U.S. PATENT DOCUMENTS

| | | | |
|---|---|---|---|
| 6,404,966 B1 | 6/2002 | Kawanishi et al. | |
| 7,174,078 B2 | 2/2007 | Libori et al. | |
| 7,190,869 B2 * | 3/2007 | Jin et al. | ......................... 385/125 |
| 2001/0017967 A1 | 8/2001 | Hirano | |
| 2001/0026667 A1 | 10/2001 | Kawanishi et al. | |
| 2005/0084223 A1 | 4/2005 | Tanaka et al. | |
| 2006/0034575 A1 | 2/2006 | Sako et al. | |
| 2006/0159410 A1 | 7/2006 | Saito et al. | |
| 2006/0257071 A1 | 11/2006 | Bise et al. | |

FOREIGN PATENT DOCUMENTS

EP   1477829 A1   11/2004

(Continued)

OTHER PUBLICATIONS

International Search Report of PCT/JP2008/053952, mail dated Apr. 8, 2008.

(Continued)

*Primary Examiner* — Jennifer Doan

(74) *Attorney, Agent, or Firm* — Westerman, Hattori, Daniels & Adrian, LLP

(57) ABSTRACT

A photonic band-gap fiber comprises a first core having a refractive index that is not higher than a refractive index of a clad; a second core that is disposed so as to surround the first core and has a refractive index that is lower than the refractive index of the first core; a clad that surrounds the second core; and a periodic structure portion that is disposed in the clad in a vicinity of the second core and is constituted by high-refractive index portions that have a refractive index higher than that of clad and form the periodic structure, and the periodic-structure portion functions as a wave-length filter. By the function of the periodic structure portion as a wavelength filter, it is possible to reduce the propagation loss of the transmission wavelength and increase the propagation loss of the cutoff wavelength.

11 Claims, 19 Drawing Sheets

FOREIGN PATENT DOCUMENTS

| | | |
|---|---|---|
| JP | 01147412 A | 6/1989 |
| JP | 2000-035521 A | 2/2000 |
| JP | 2002237637 A | 8/2002 |
| JP | 2003075657 A | 3/2003 |
| JP | 2003-222739 A | 8/2003 |
| JP | 2003229618 A | 8/2003 |
| JP | 2005025056 A | 1/2005 |
| JP | 2005202440 A | 7/2005 |
| JP | 2006-011328 A | 1/2006 |
| JP | 2006011328 A | 1/2006 |
| JP | 2006126725 A | 5/2006 |
| JP | 2006-139018 A | 6/2006 |
| JP | 2007-033466 A | 2/2007 |
| WO | 0042458 A1 | 7/2000 |
| WO | 00/62106 A1 | 10/2000 |
| WO | 03065089 A1 | 8/2003 |

OTHER PUBLICATIONS

J. D. Love et al.; "Radiation from single-mode helical fibical", Electronics letters, vol. 23, No. 21, pp. 1109-1110, 1987.

John M. Fini; "Design of solid and microstructure fibers for suppersion of higher-order modes", Optics Express, vol. 13, No. 9, p. 3477, 2005.

Japanese Office Action dated Apr. 7, 2009, issued in corresponding Japanese Patent Application No. 2008-541531 (With English Translation).

Japanese Office Action dated Dec. 2, 2008, issued in corresponding Japanese Patent Application No. 2008-541531 (With English Translation).

Japanese Office Action dated Jul. 7, 2009, issued in corresponding Japanese Patent Application No. 2009-502609 (With English Translation).

Japanese Office Action dated Mar. 17, 2009, issued in corresponding Japanese Patent Application No. 2009-502609 (With English Translation).

L. Lavoute et al.; "Design of microstructured single-mode fiber combining large mode area and high rare earth ion concentration", Optics Express, vol. 14, No. 7. p. 2994, 2006.

Ryuichiro Goto et al.,: B-13-15, "Silica-Based Wide- Band solid Photonic Band Gap Fiber", Proceedings of the Communications Society Conference of IEICE 2, Sep. 7, 2006, p. 322, with partial English translation thereof.

Ryuichiro Goto et al.; "Silica-based Wide-band Solid Photonic Band Gap Fiber" Technical Report of IEICE,, OCS Optical Communication System, Aug. 17, 2006, vol. 106, No. 210, pp. 39-42, with partial English translation thereof.

Takatoshi Kato et al., "Ultra Low Non-linearity Low Loss Pure Silica Core Fiber for Long- Haul WDM Transmission", Proceedings of the Electronics, Information and Techniques society Conference of IEICE 1, Aug. 16, 1999, p. 182, C-3-76, with partial English Translation thereof.

Takayoshi Kato et al., "Dispersion Shifted Fiber for WDM Trasmission", Technical Report of IEICE, OCS, Optical Communication System, Nov. 1, 1996, vol. 96, No. 335, pp. 43-48, with partial English translation thereof.

Tetsuya Miki et al., "Photonic Technology Handbook", Optics Co., Ltd, Jan. 30, 2002, first impression of the first edition, pp. 196-198, with partial English translation thereof.

Japanese Office Action dated Nov. 24, 2009, issued in corresponding Japanese Patent Application No. 2009-502609 (With English Translation).

Brechet, F. et al; "Analysis of bandpass filtering behaviour of singlemode depressed-core-index photonic-bandgap fibre"; Electronics Letters, IEE Strevenage, GB LNKD- DOI: 10.1049/EL: 20000675, vol. 36, No. 10, May 11, 2000, pp. 870-872.

European Search Report dated May 10, 2010, issued in corresponding European Patent Application No. 08721372.4.

Fevrier, S. et al.; "Low-loss singlemode large mode area all-silica photonic bandgap fiber" Optics Express, OSA (Optical Society of America), Washington DC, (US) LNKD- DOI: 10.1364/OPEX.14.000562, vol. 14, No. 2, Jan. 23, 2006, pp. 562-569.

Min, Yan et al.; "Loss Property of Photonic Bandgap Fiber Made of High-index Cylinders in Low-index Host Material"; Communications, Circuits and Systems, 2004. ICCCAS 2004. 2004 Internal IONAL Conference on Chengdu, China Jun. 27-29, 2004, Piscataway, NJ, USA, IEEE, US LNKD-DOI: 10.1109/ICCCAS.2004.1346248, Jun. 27, 2004, pp. 656-659, vol. 1.

Steinvurzel, P. et al.; "Continuously tunable bandpass filitering using high-index inclusion microstructured optical fibre" Electronics Letters, IEE Stevenage, GB LNKD-DOI: 10.1049/EL: 20050037, vol. 41, No. 8, Apr. 14, 2005, pp. 463-464.

Tanigawa, S. et al.: "Bend Sensitive Wavelength Filtering in Concentric Core Solid Photonic Bandgap Fibre" Opto-Electronics and Communications Conference, 2008 and The 2008 Australian Conference on Optical Fibre Technology. OECC/ACOFT 2008. Joint Conference of the, IEEE, Piscataway, NJ, USA, Jul. 7, 2008, pp. 1-2.

International Search Report of PCT/JP2008/053515, date of mailing Apr. 22, 2008.

Supplementary European Search Report dated Apr. 12, 2011, issued in corresponding European Patent Application No. 08712086.1.

Goto R. et al., "Single-polarization operation in birefringent all-solid hybrid microstructured fiber with additional stress applying parts", Optics Letters, OSA, Optical Society of America, Washington, DC, US, vol. 34, No. 20, Oct. 15, 2009, pp. 3119-3121, XP001549142.

* cited by examiner

PHOTONIC BAND-GAP FIBER

TECHNICAL FIELD

The present invention relates to a photonic band-gap fiber, specifically relates to a photonic band-gap fiber that has a function of a wavelength filter.

Priority is claimed on Japanese Patent Application No. 2007-54273, filed on Mar. 5, 2007, and Japanese Patent Application No. 2007-149180, filed on Jun. 5, 2007, the contents of which are incorporated herein by references.

BACKGROUND ART

Recently, attention has been paid to high-output fiber lasers that utilize optical fibers doped with rare earth element. A high-output fiber laser is constituted such that pump light and signal light propagate in the fiber while amplifying the signal light using the pump light. Such a fiber has advantages, for example, in that the fiber is easily cooled, and it is possible to reduce the size of an apparatus.

In such a high output fiber laser, a fiber having an effect of a wavelength filter is required so as to suppress non-linear effects such as amplified spontaneous emission (ASE) and stimulated Raman scattering.

For example, a technique described in the Patent Reference 1 has been proposed as a conventional art related to an optical fiber that functions as a wavelength filter.

This prior art discloses that a wavelength filtering effect is provided such that the mode propagating in a normal core having a refractive index larger than the clad is coupled with the mode propagating in a portion of similarly increased refractive index provided in a periphery of the core only at a specific wavelength.

Patent Reference 1: United States Patent Application, Publication No. 2006/257071.

DISCLOSURE OF INVENTION

Problems to be Solved by the Invention

However, the above-described conventional art included the following problems.

In Patent Reference 1, the mode propagating in the portion at a periphery of the core also propagates in the fiber. Therefore the mode is again coupled with the mode propagating in the core, and returns to the core. Therefore, in the method of Patent Reference 1, the effect of suppressing a propagation of cut-off wavelength is limited.

The present invention was carried out based on the consideration on the above-described circumstance and an object of the invention is to provide a fiber having an effect of wavelength filtering in which a propagation-loss of transmission wavelength is reduced and a propagation-loss of cutoff wavelength is increased.

Devices for Solving the Problems

In order to achieve the above-described object, the present invention provides a photonic band-gap fiber comprising: a first core that has a reflective index not higher than the reflective index of a clad; a second core that is provided so as to surround the first core and which has a refractive index smaller than the refractive index of the first core; a clad that surrounds the second core; and a periodic structure portion that is disposed in the vicinity of the second core in the clad, wherein high-refractive index portions (high-index portions) having a refractive index higher than that of the clad form a periodic structure to constitute the periodic-structure portion, and the periodic-structure portion functions as a wavelength filter.

The present invention also provides a photonic-band gap fiber including: a first core having a refractive index defined by 0% to 0.1% of relative refractive index difference relative to the refractive index of the clad; a second core disposed so as to surround the first core and having a refractive index lower than the refractive index of the first core; a clad that surrounds the second core; and a periodic structure portion that is disposed in the vicinity of the second core in the clad, wherein high-refractive index portions having a refractive index higher than that of the clad form a periodic structure to constitute the periodic-structure portion, and the periodic-structure portion functions as a wavelength filter.

In the photonic band-gap fiber of the present invention, it is preferable that the periodic structure portion has a rotation symmetry of 2 fold or less, and acts as a polarization maintaining fiber or a single polarization fiber.

In the photonic band-gap fiber according to the present invention, it is preferable that the periodic structure portion is disposed such that a large number (a plural number) of the above-described high-refractive index portion contains at least any one selected from a triangular lattice structure, honeycomb lattice structure, square lattice structure, or a rectangular lattice structure.

In the photonic band gap fiber of the present invention, it is preferable that a section of the first core has a circular shape.

In the photonic-band gap fiber of the present invention, it is preferable that air holes do not exist in an interior of the periodic structure, the first core, and the second core.

In the photonic band gap fiber according to the present invention, the relative-refractive index difference of the first core relative to the clad is in a range of 0.1% to −1.0%, a relative-refractive index difference of the second core relative to the clad is in a range of −0.01 to −1.5%.

In the photonic band gap fiber of the present invention, the maximum refractive index difference of the high-refractive index portion compared with the clad is in a range of 0.5% to 4.0%.

In the photonic band gap fiber of the present invention, it is preferable that the clad is surrounded by a medium having a refractive index smaller than that of the clad.

In the photonic band gap fiber of the present invention, it is preferable that the periodic structure is disposed in a helical arrangement around the first core as a center axis.

In the photonic band gap fiber of the present invention, a fiber grating is formed in at least a portion of the above-described periodic structure such that the refractive index is modulated along a lengthwise direction of the fiber.

Effect of the Invention

By disposing the periodic structure around the first and the second core, it is possible to effect the photonic band-gap fiber of the present invention as a wavelength filter.

In addition, in the photonic band-gap fiber of the present invention, since the refractive indices of the first core and the second core are not more than or less than the refractive index of the clad, a principle of the fiber is a wave-guidance by the photonic band-gap. Therefore, principally, it is possible to avoid a generation of a phenomena in that the electric field of a mode propagating in the core is coupled with a mode propagating in the periodic structure, then coupled mode propagates and is subsequently re-coupled with the mode propagating in the core. As a result, it is possible to achieve an effect of high wavelength filtering at a cutoff wavelength.

EXPLANATION OF SYMBOLS 10, 100, 120, 140, 170, 180, 190: clad
11, 101, 121, 141, 171, 181, 191: first core
12, 102, 122, 142, 171, 182: second core
13, 103, 123, 143, 173, 183, 193: high-refractive index portion

BEST MODE FOR CARRYING OUT THE INVENTION

In the following, an embodiment of a photonic band-gap fiber of the present invention is explained with reference to drawings.

Figure 1:
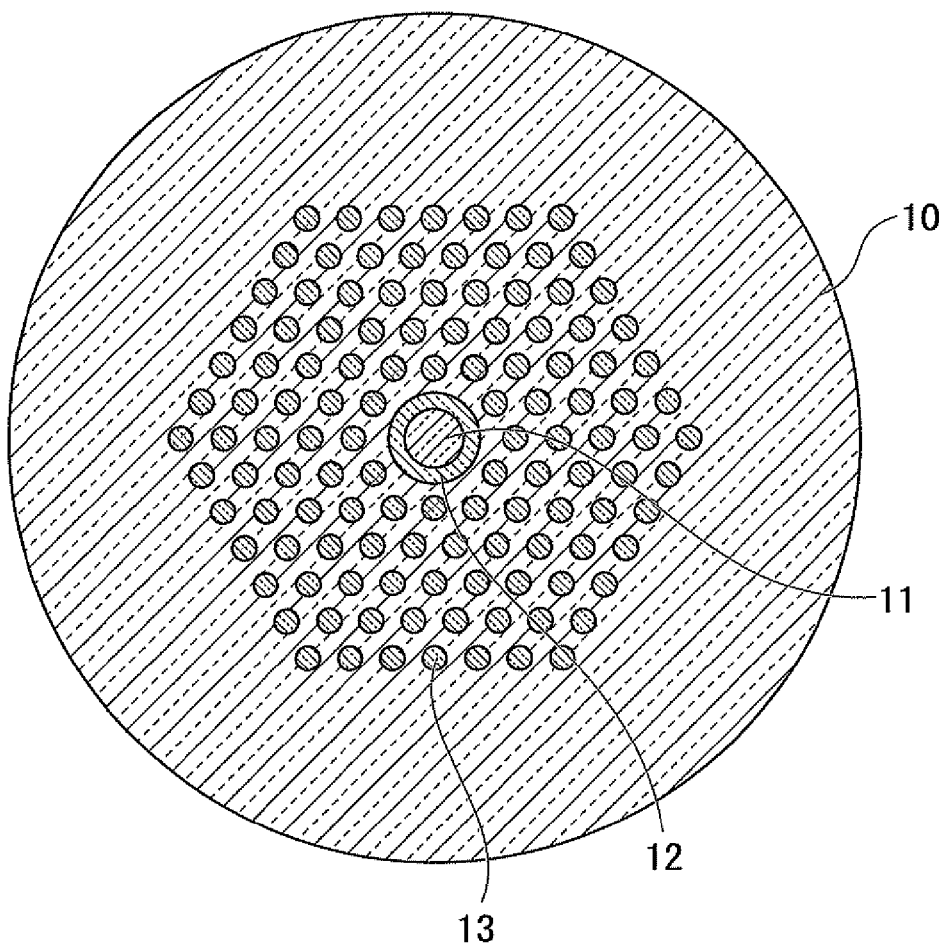
FIG. 1 is a cross-sectional view showing an embodiment of a photonic band-gap fiber of the present invention.

FIG. 1 is a drawing showing an embodiment of a photonic band-gap fiber according to the present invention.

A photonic band-gap fiber according to the present embodiment includes a first core 11 that has a refractive index of not higher than that of a clad 10, a second core that is disposed so as to surround the first core 11 and has a refractive index lower than that of the first core 11, a clad 10 that surrounds the second core 12, and large numbers of high refractive index portions 13 that are disposed in the clad in the vicinity of the second core 12. The high refractive index portions 13 have a higher refractive index than that of the clad 10 and show periodic insular arrangement forming a triangular lattice structure in a section.

In this embodiment of the photonic band-gap fiber, a propagation constant of the mode at a transmission wavelength is in the photonic band-gap determined by the periodic structure, and a propagation constant of a mode at a cutoff wavelength is outside the photonic band-gap. At that time, the photonic band-gap strengthens the confinement of the mode at the transmission wavelength. On the other hand, the photonic band-gap does not have an effect to enhance the confinement of the mode at a cutoff wavelength.

Without the periodic structure, the fiber of the basic structure shows large propagation loss at a transmission wavelength and at a cutoff wavelength. By adding the periodic structure, it is possible to selectively cause the transmission wavelength to propagate at a low propagation-loss.

In the photonic band-gap fiber of the present embodiment, refractive indices of the first core 11 and the second core 12 are not more than the refractive index of the clad 10. Therefore, an operation-principle of the fiber is a wave-guiding by the photonic band-gap. Based on this principle, it is possible to avoid occurrence of a phenomena in that electric field of a mode propagating in the core is coupled with the mode propagating in the periodic structure, then the coupled mode propagates and subsequently be re-coupled with the mode propagating in the core. Therefore, a photonic band-gap fiber of the present embodiment can achieve a high filtering effect with respect to a light that has a wavelength of which a propagation constant of a mode is outside the photonic band-gap fiber.

While the refractive index of the first core 11 and the second core 12 are not higher than that of the clad 10 in the photonic band-gap fiber according to the present embodiment, the refractive index of the first core 11 may be up to about 0.1% higher than that of the clad. In this case, a core mode exist in the first core 11. The core mode has an effective refractive index of an intermediate value between the refractive index of the first core and the refractive index of the clad 10, and propagates in the core. Since the electric field of the core mode can be mutually coupled with an electric field of the mode of cutoff-wavelength propagating in the periodic structure portion, there is a possibility of an occurrence of the phenomena in that the electric filed once coupled to a mode propagates in the periodic structure from a core mode, is re-coupled to the core mode. However, since the mode propagating in the periodic structure portion and allowing coupling with the core mode is weakly confined, it is possible to release the confinement of the mode propagating in the periodic structure portion even when an extremely large bending loss which cannot be avoided while using the photonic band-gap fiber is generated. By this, it is possible to suppress the phenomena in that the electric field once coupled to a mode propagates in the periodic structure from a core mode, is re-coupled to the core mode. Therefore, even though the refractive index of the first core 11 is up to about 0.1% higher than that of the clad 10, in a similar manner as in the case in which the refractive indices of the first core and the second core are not higher than that of the clad 10, it is possible to achieve a high filtering effect with respect to the light having a wavelength of which the propagation constant of the mode is outside the photonic bandgap.

In the photonic bandgap fiber of the present invention, section of the first core has a circular shape. Therefore, a mode-field of the fiber has a substantially concentric circular shape. When the fibers are connected each other, angle-dependence does not occur in the connection-loss. In addition, the fibers of the present invention can be connected to a conventional optical fiber having a concentric refractive index profile.

Further, the photonic band-gap fiber of the present invention has a solid structure free of air holes in the interior of the above-described periodic structure portion and the core. Therefore, when the fibers are connected to each other, or connected to the other type of optical fiber, hole collapse by heating (a phenomena that occurs under an existence of voids) does not occur, and the structure of the end-face of the fiber at the fusion spliced point does not change. Therefore, it is possible to perform fusion splicing of the fiber whole controlling the optical loss at a low level.

In addition, in the photonic band-gap fiber of the present embodiment, the first core 11, the second core 12, the high refractive index portion 13, and the clad 10 are each made of silica glass. Therefore, it is possible to realize a low-loss fiber, and it is possible to fusion-bond the fiber to a silica glass optical fiber widely used in the present time.

The photonic band-gap fiber of the present embodiment may be prepared by a method similar to the known method of producing a photonic band-gap fiber. An embodiment of the method is explained below.

Firstly, the below-described materials are prepared in this embodiment.

(1) A silica glass rod forming a core is prepared such that a second core 12 made of fluorine-doped silica glass having a low refractive index is disposed around the first core 11 made of silica glass.

(2) Two layered silica glass rods are prepared such that each rod has a center portion that is made of silica glass doped with germanium and has a refractive index higher than that of pure silica glass, and an outer layer that surrounds the center portion and is made of pure silica glass, where the center portion constitutes the high refractive index portion 13.

(3) A cylinder made of pure silica glass is prepared for constituting the clad 10. While a cross section of the cylinder may have a circular shape of hollow, it is preferable that the cross section has a hexagonal shape hollow such that the silica rods having a cross section of circular shape are closely packed in the hollow.

Next, in the interior of the cylinder described in (3), the silica rod for a core described in (1) is packed in the center, and the two layered silica glass rods described in (2) are packed in its circumference so as to form a plural stacking. FIG. 1 indicates an embodiment in which two-layered silica glass rods are stacked to form five layers.

Next, the above-described packed body is placed in a vacuum heating furnace and the packed body as a whole is heated by a heater or the like. Alternatively, two ends of the packed body may be confined by installing caps. While evacuating the interior of the cylinder through the caps, an outer portion of the cylinder is heated by an oxygen-hydrogen frame. As a result, the silica glass is softened and fills in the interstices of the cylinder. Thus, the preform of the optical fiber having a structure shown in FIG. 1 is prepared.

Next, the thus obtained preform of an optical fiber is set in a known optical fiber-drawing apparatus (drawing apparatus), and is drawn in the same manner as in the production of general optical fibers, thereby obtaining the photonic band-gap fiber of FIG. 1. In the time of drawing the fiber, it is preferable to coat an ultra-violet hardening type resin on the outer surface of the thus-obtained bare optical fiber, and subject the optical fiber to UV-irradiation, thereby disposing a coating layer by hardening the resin.

The above-described production method is only an example. The method is not limited to the example, and various modification may be allowable. For example, as an alternative to the two-layered glass rods described in (2), high refractive index glass rods having higher refractive index than the pure silica glass rods may be prepared and these rods may be packed one by one in the cylinder.

As a first example according to the present invention, a photonic band-gap fiber having a structure shown in FIG. 1 was produced. The clad 10 is made of pure silica glass having a refractive index of 1.45. The first core 11 having a diameter d1 of 17.8 μm and relative refractive index difference Δ1 from the clad of 0% is disposed in the clad. The second core 12 having a diameter d2 of 25 μm and relative refractive index difference Δ2 from the clad 10 of −3.6% exists around the first core 11. The high refractive index portions 13 each having a diameter dh of 5.6 μm and relative refractive index difference Δh from the clad 10 of 1.6% are arranged around the second core 12 so as to form a periodic structure of triangular lattice with a periodic interval of 14.0 μm. The triangular lattice lacks two layers from the centre so as to dispose the core, and forms five layered periodic structure.

Figure 2:
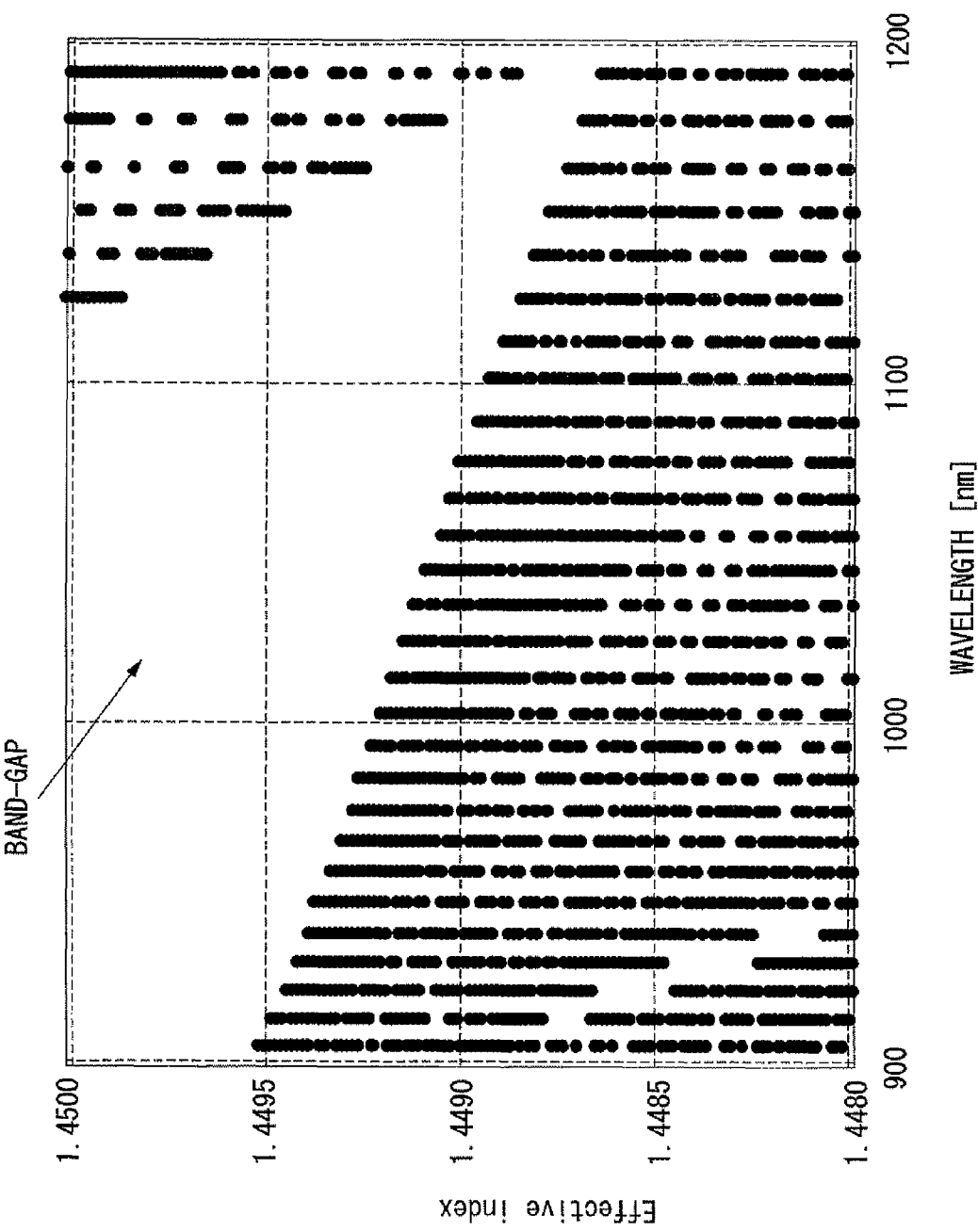
FIG. 2 is a band diagram of a photonic band-gap fiber produced in Example 1.
Figure 3:
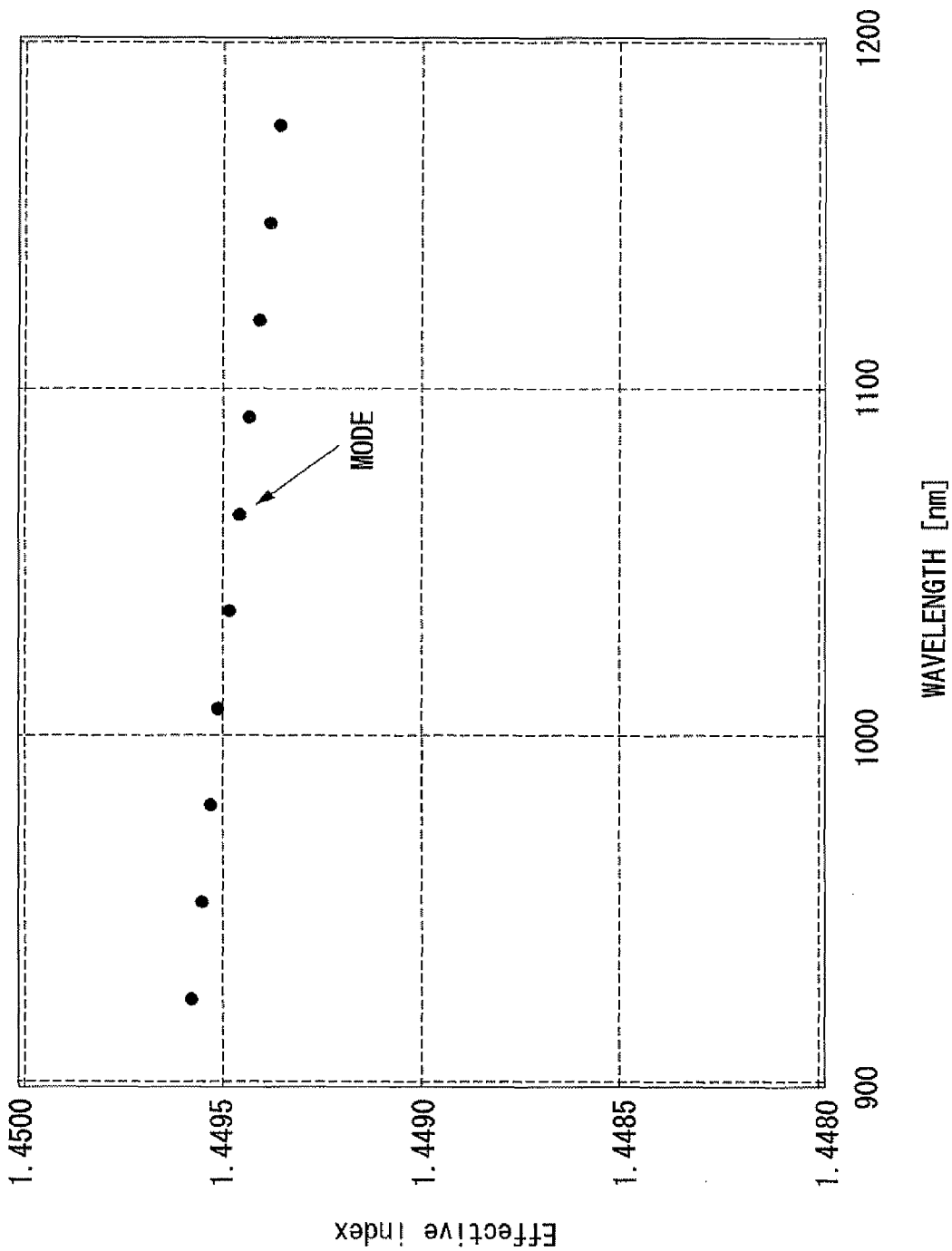
FIG. 3 is a dispersion curve of a mode in a fiber that does not have the periodic structure.
Figure 4:
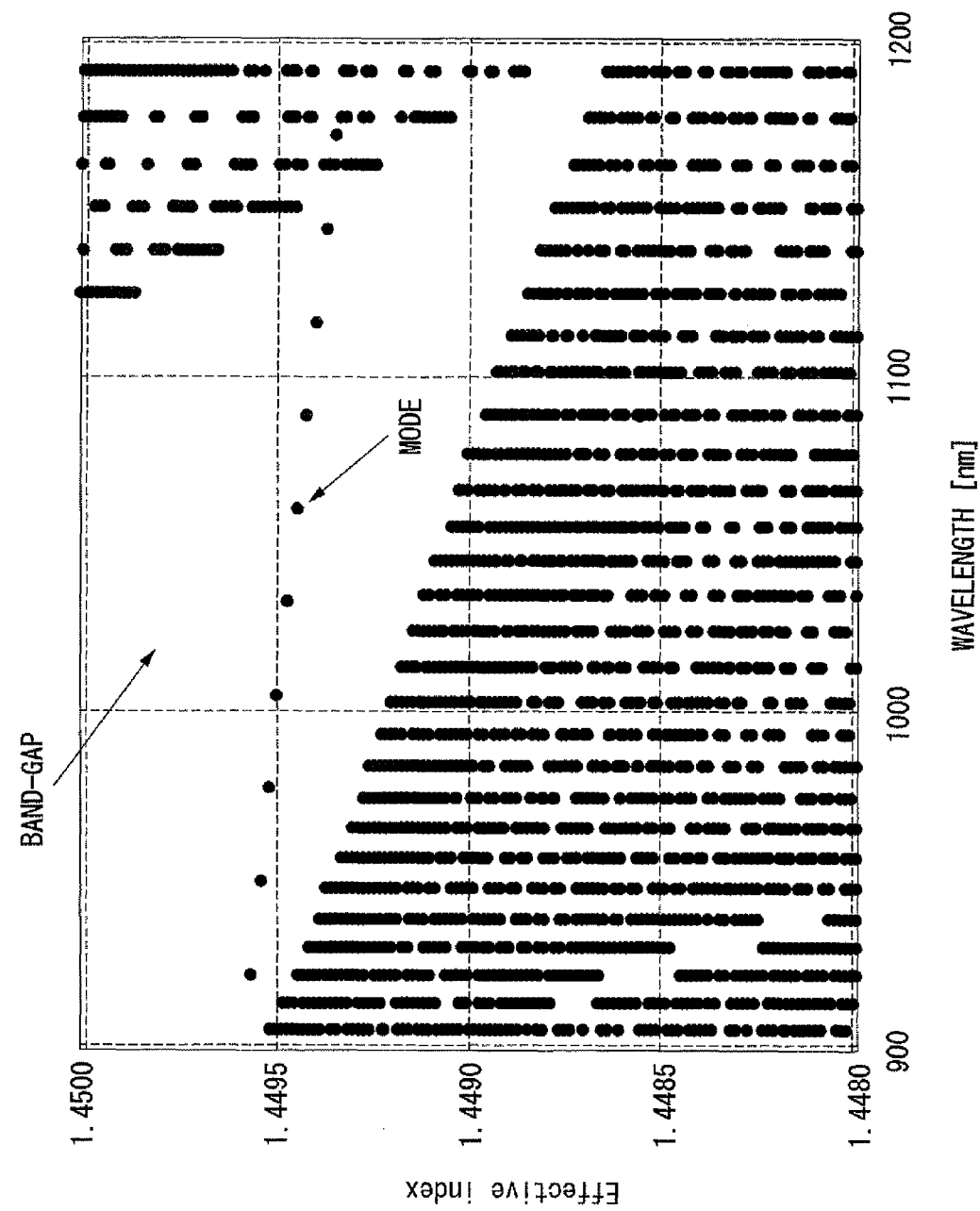
FIG. 4 is a band diagram obtained by overlaying the results of FIG. 2 and FIG. 3.

FIG. 3 shows a dispersion curve of a mode guided (waveguided) in the core of an optical fiber, where the fiber has a basic structure that lacks a periodic structure around the second core 12. A band diagram of the periodic structure is shown in FIG. 2. In this map, the region showing no data points denotes the band-gap. In the fiber having a structure including a core surrounded by the periodic structure as shown in FIG. 1, confinement of the mode occurs by the effect of the photonic band-gap, where dispersion curve of the mode guided in the core is enclosed in the band-gap at the wavelength of the mode. FIG. 4 shows a result of superimposing the band diagram of the periodic structure on the dispersion curve of the mode guided in the core. As is obvious from these figures, the dispersion curve of the mode guided in the core exists in the band-gap where the wavelength is 1.0 μm to 1.1 μm. On the other hand, where the wavelength is 1.2 μm, the dispersion curve of the core-mode is not present in the band-gap. As a result, the mode guided in the core at a wavelength of 1.2 µm is not confined by the periodic structure. Therefore, the photonic band-gap fiber of FIG. 1 can function as a wavelength filter.

Figure 5:
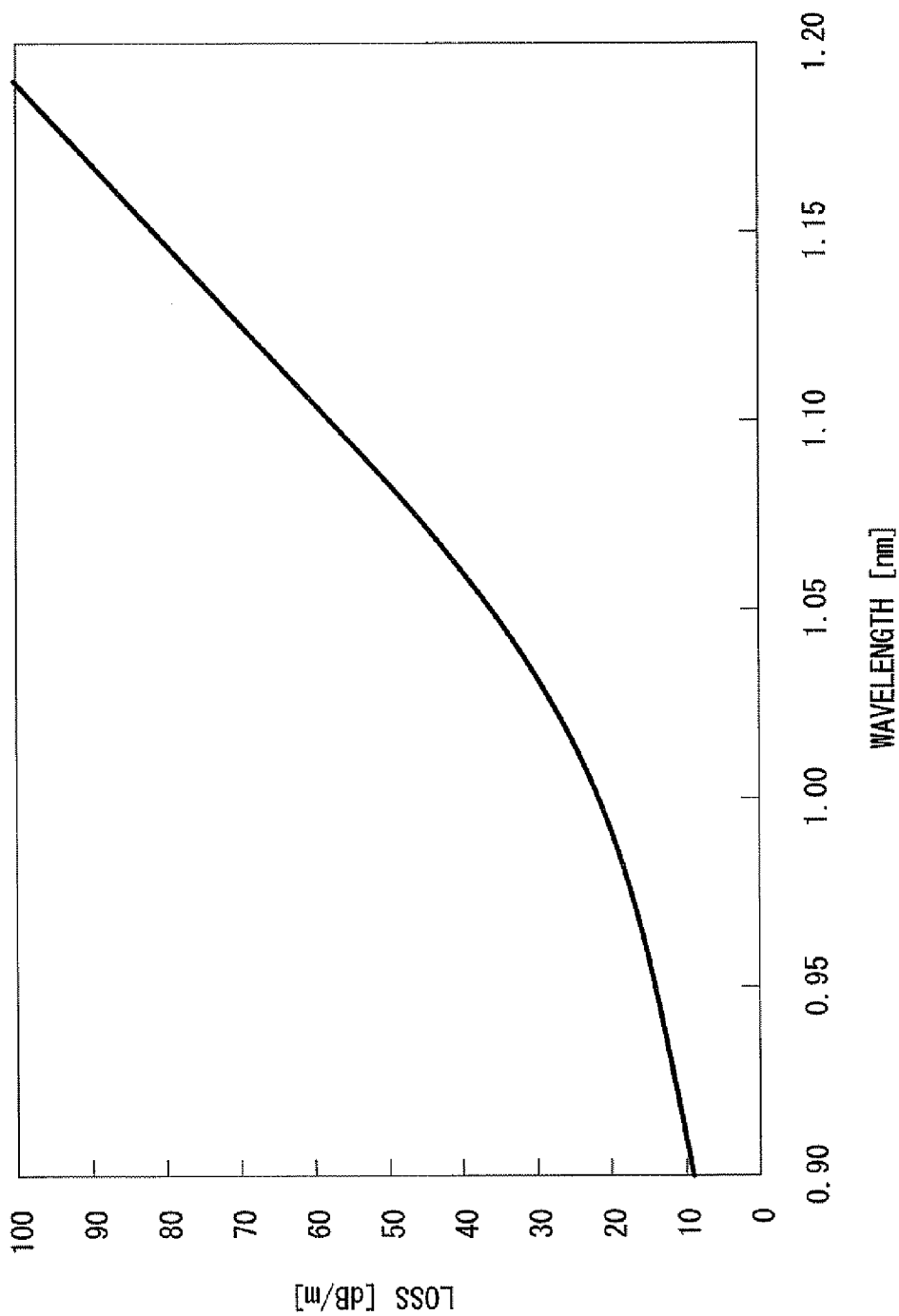
FIG. 5 is a graph obtained in Example 1 showing the results of a calculation of optical loss in a fiber that does not have a periodic structure.

FIG. 5 shows the results of a calculation of mode-loss in a fiber of a basic structure, where the second core 12 is not surrounded by the periodic structure. Large loss occurs irrespective of the wavelength.

Figure 6:
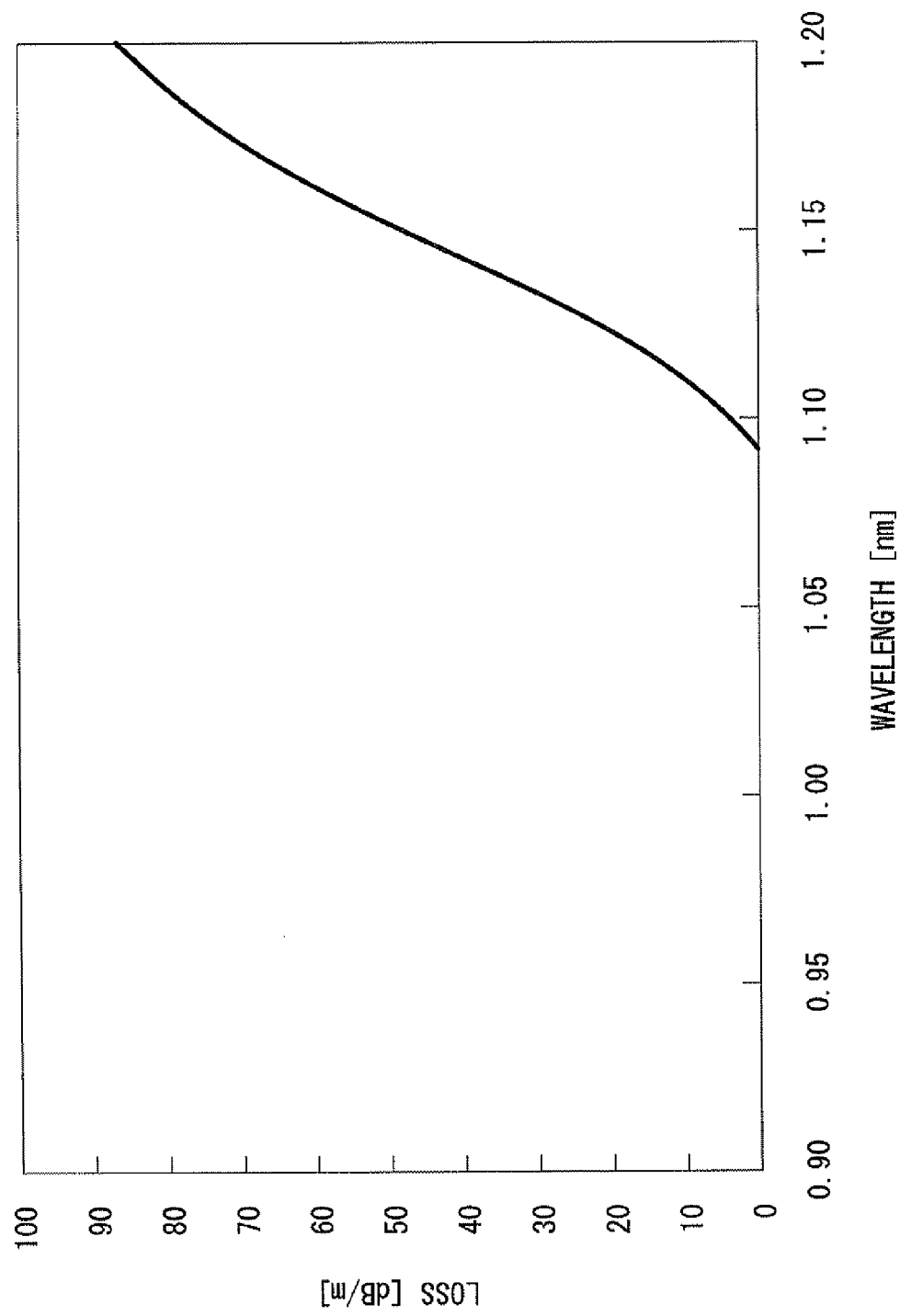
FIG. 6 is a graph obtained in Example 1 showing the results of a calculation of optical loss in a fiber disposed with a periodic structure.

On the other hand, FIG. 6 is the results of a calculation of mode-loss where the periodic structure shown in FIG. 1 is provided.

As shown in FIG. 6, mode-loss is very small in the band-gap, while the mode-loss is large at the ends of the band-gap, and outside the band-gap.

Therefore, the fiber according to the present invention has an effect of removing light, for example unnecessary ASE light or stimulated Raman scattering, having a wavelength different from that of signal light. For example, where the fiber laser oscillates at a wavelength of 1.08 µm, stimulated Raman scattering appears around the wavelength of 1.14 µm. Since the loss of the fundamental mode is 30 dB/m or more at a wavelength of 1.14 µm, it is possible to suppress the stimulated Raman scattering effectively.

Figure 7:
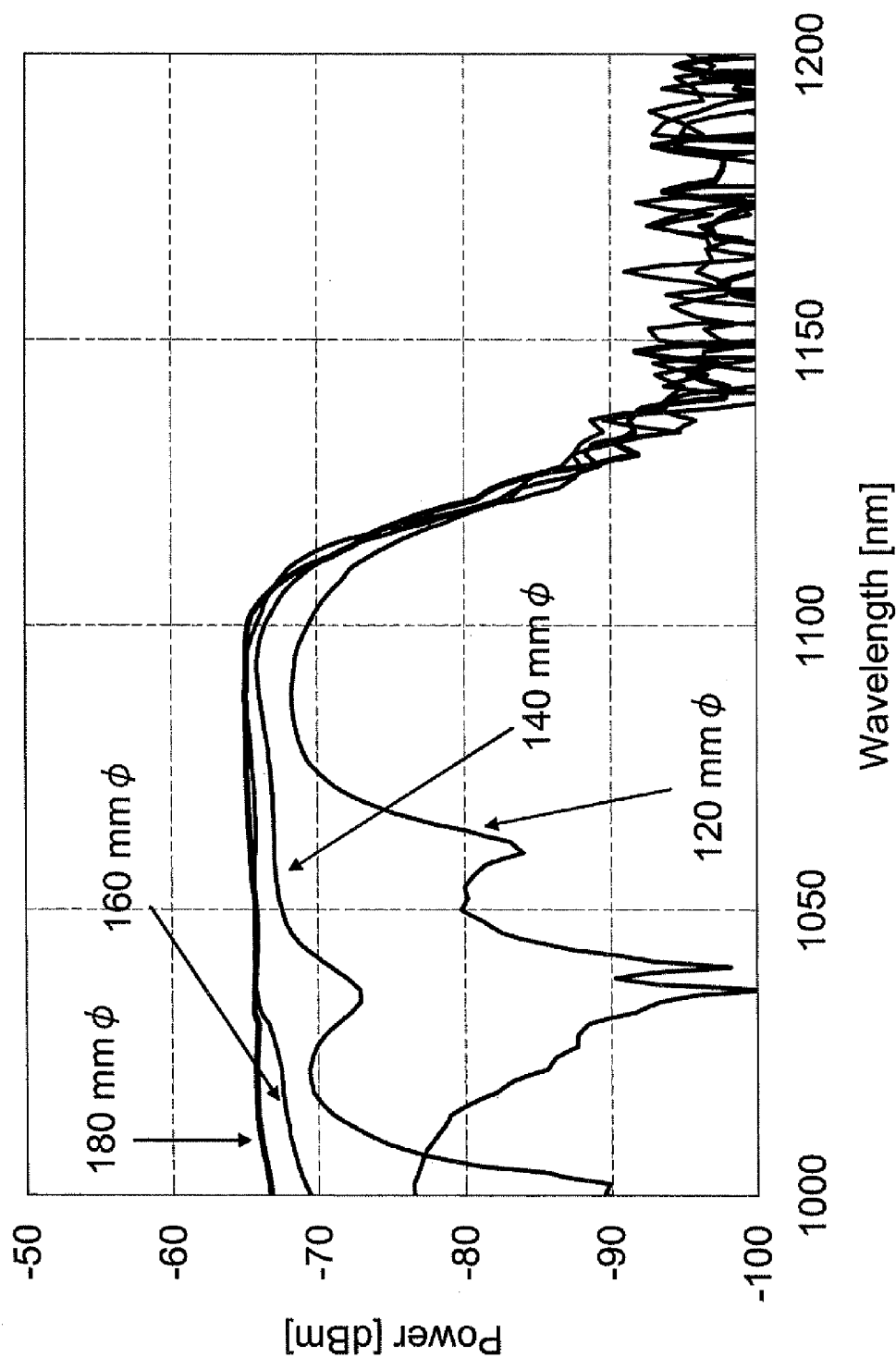
FIG. 7 is a graph showing the results of measurement of a transmission band (transmission range) of a photonic band-gap fiber produced in Example 1.

A photonic band-gap fiber having a structure of FIG. 1 was produced. 1 m length of fiber was pulled out, only the core portion was excited by the white light, and the transmission band was measured. The result is shown in FIG. 7. Bending diameters varied from 180 mmφ to 120 mmφ. It can be understood that the light of a wavelength of 1.08 µm propagates but the light of a wavelength of 1.14 µm is attenuated by about 30 dB where the bending diameter is between 180 mmφ and 160 mmφ. Therefore, this fiber can effectively suppress the generation of stimulated Raman scattering having a wavelength of 1.14 µm when the high power fiber laser was oscillated at a wavelength of 1.08 µm.

Figure 8:
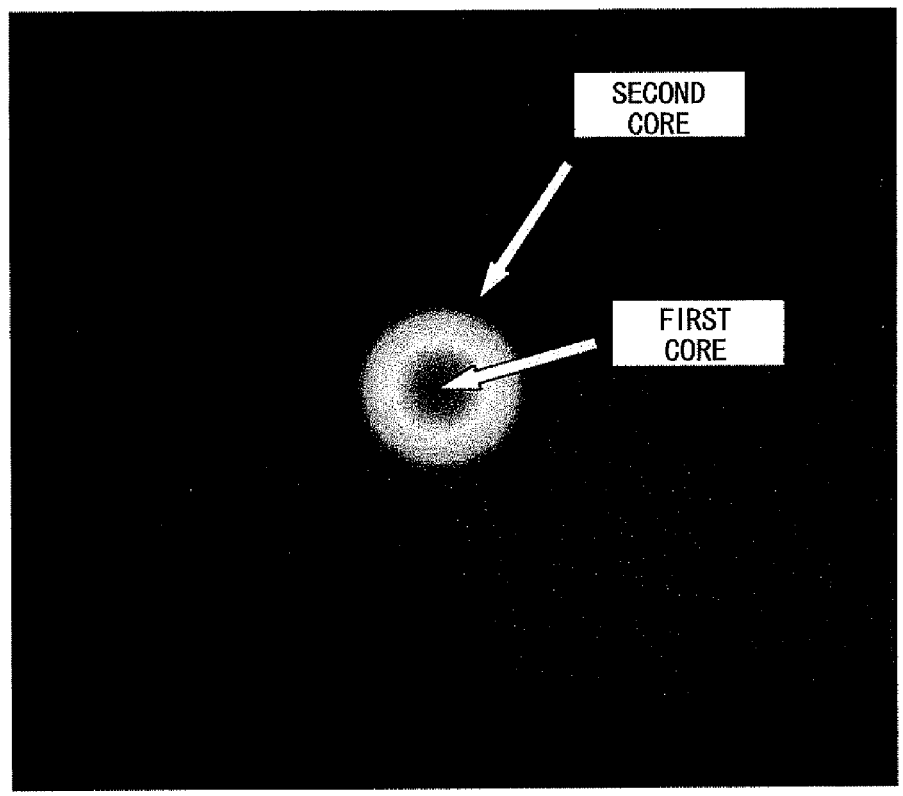
FIG. 8 is a drawing for showing a mode propagating in the first core of a photonic band-gap fiber produced in Example 1.
Figure 9:
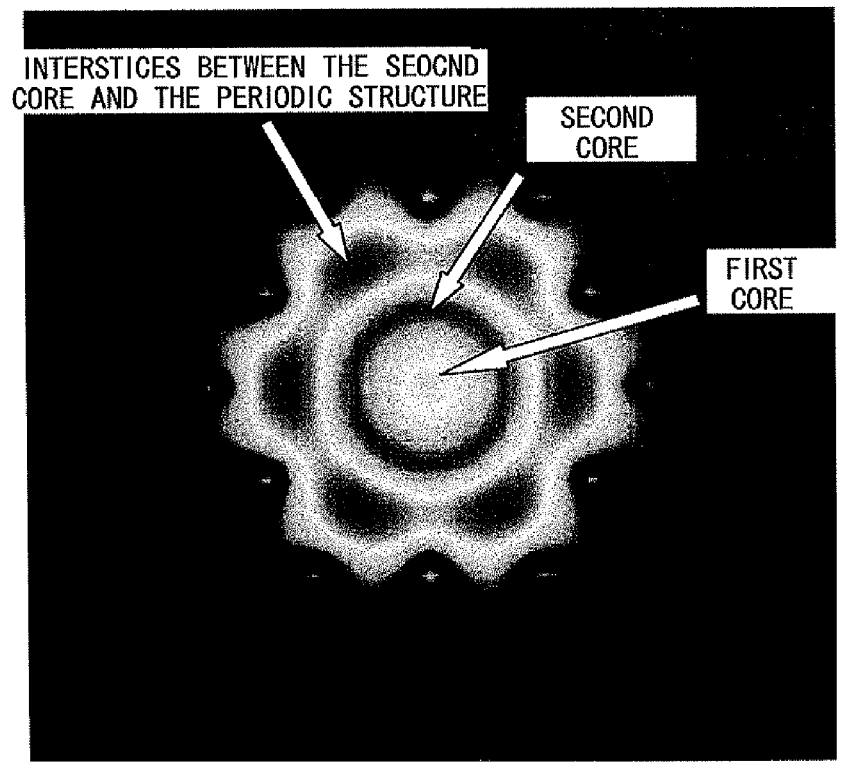
FIG. 9 is a graph showing a mode propagating in a portion between the second core and the periodic structure of the photonic band-gap fiber produced in Example 1.

In addition, it is understood that transmission characteristics at a wavelength of 1.00 µm to 1.05 µm is largely changed by changing the bending diameter from 180 mmφ to 120 mmφ. This is caused by the bending resulting in leakage of the mode, as shown in FIG. 8, propagating in the first core by coupling with the mode, as shown in FIG. 9, mainly propagating in a portion between the second core and the periodic structure. Since the mode propagating in the portion between the second core and the periodic structure is weakly confined, the light is easily radiated to the clad by bending or the like, thereby causing propagation loss. By appropriately controlling the bending diameter of the fiber, it is possible to dampen unnecessary light, such as ASE at a wavelength of 1.00 µm to 1.05 µm and parasitic oscillation, frequently causing problems in a fiber-laser.

Example 2

Figure 10:
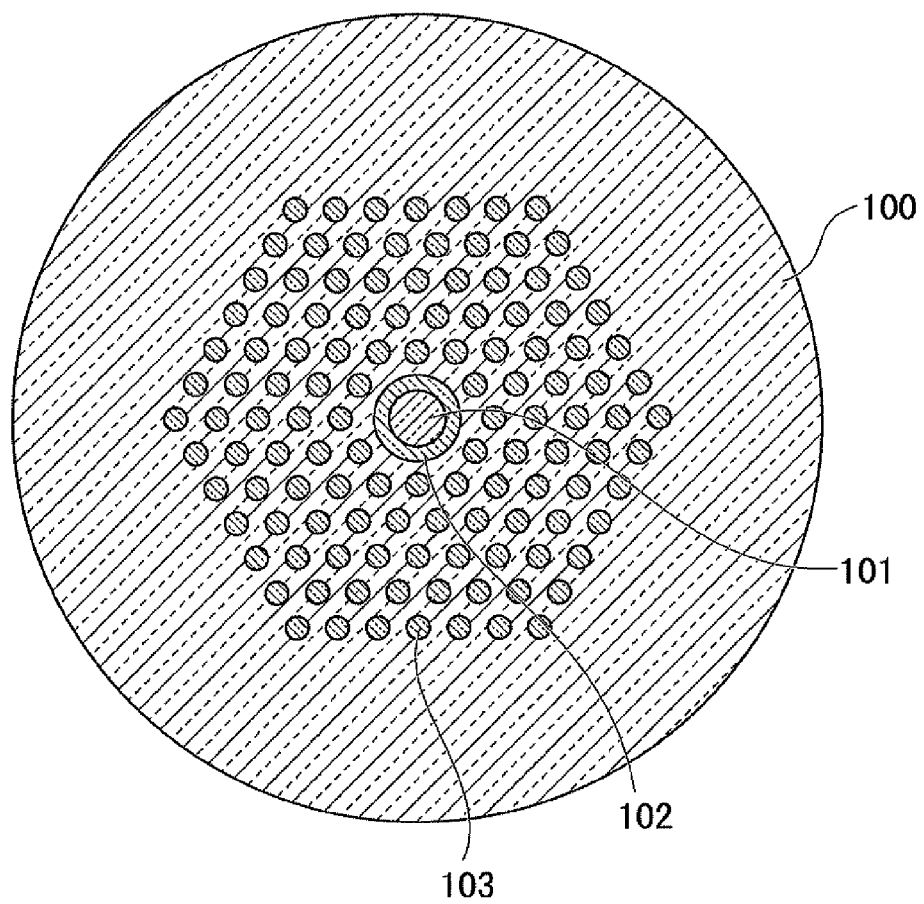
FIG. 10 is a cross-sectional view of a photonic band-gap fiber prepared in Example 2.

As another example according to the present invention, a photonic band-gap fiber having a structure shown in FIG. 10 was produced. The clad 100 is made of pure silica glass having a refractive index of 1.45. The first core 101 having a diameter d1 of 12.0 µm and relative refractive index difference Δ1 from the clad of 0% is disposed in the clad 100. The second core 102 having a diameter d3 of 22.0 µm and relative refractive index difference Δ2 from the clad 10 of −3.6% exists around the first core 101. The high refractive index portions 103 each having a diameter dh of 3.6 µm and a relative refractive index difference Δh from the clad 100 of 1.6% are arranged around the second core 102 so as to form a periodic structure of triangle lattice with a periodic interval of 9.0 µm. The periodic structure lacks two layers from the center so as to dispose the core therein, and forms five layered periodic structure.

Figure 11:
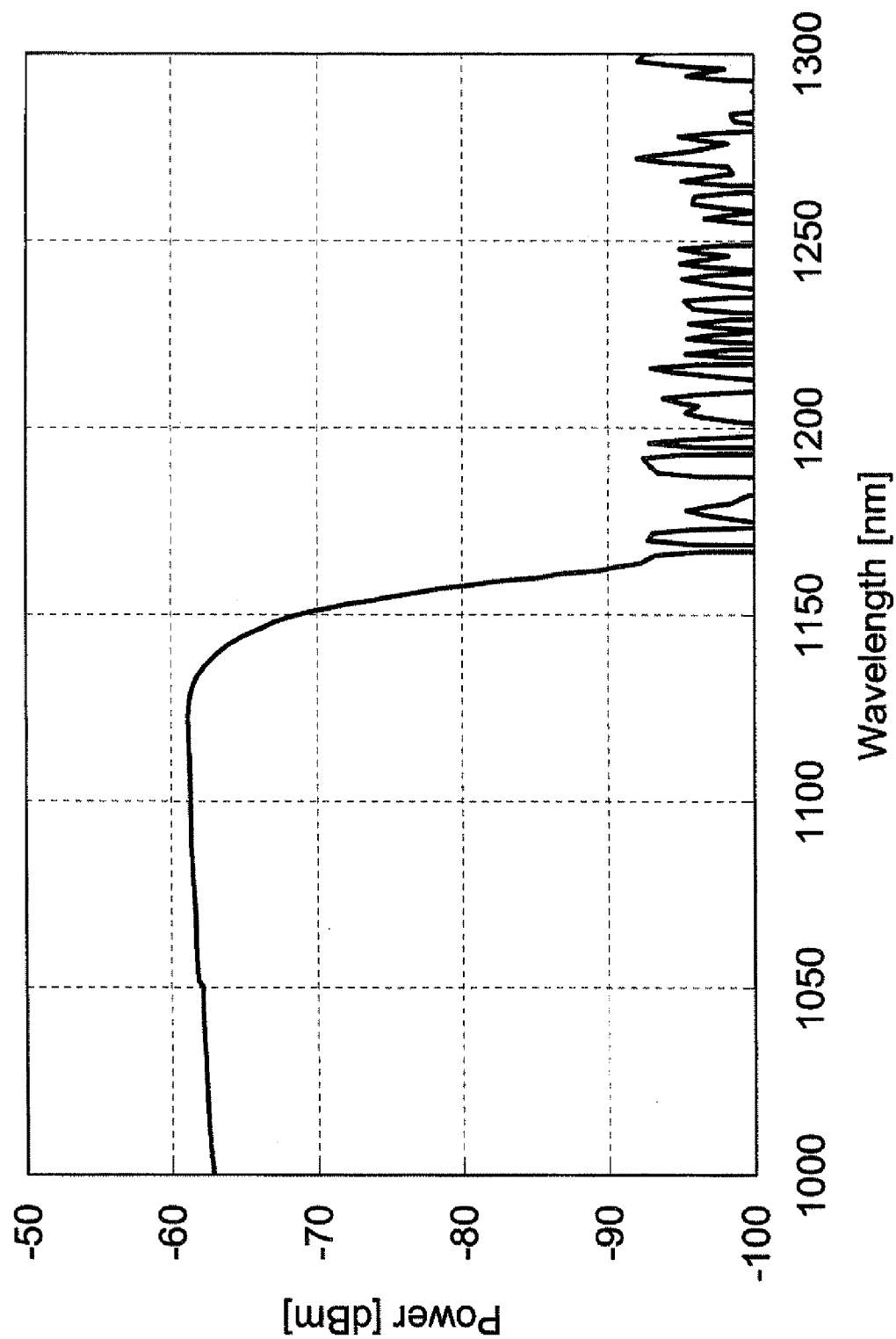
FIG. 11 is a graph showing the results of measurement of a transmission band of the photonic band-gap fiber produced in Example 2.

From the thus produced fiber, a 2 m length of fiber was extracted. Under a wound state of the fiber having a coil diameter of 200 mmφ, only a core portion was excited by white light, and the transmission band was measured. The result is shown in FIG. 11.

As shown in the figure, strength of the transmission light steeply decreases near the wavelength of 1.13 µm. Therefore, when an incident laser light has a wavelength of 1.06 µm, while a first order stimulated Raman scattering at a wavelength around 1.12 µm is generated, it is possible to suppress second or higher order stimulated Raman scattering at a wavelength around 1.18 µm. Therefore, this fiber functions as a fiber that can effectively generate the first order stimulated Raman scattering.

This fiber was fusion-spliced to a conventional type fiber having a concentric distribution of refractive index and a similar mode-field diameter. As a result, it was possible to stably obtain a fusion-splicing loss of 0.1 dB or less at a wavelength of 1.06 µm. Distribution of an electric field mainly depends on the shape of the first core. Since the first core of this fiber has a circular section, the electric field shows a concentric distribution. Therefore, it is possible to reduce connection loss caused by the difference in the shape of the mode field. Thus, in the photonic band-gap fiber of the present invention, it is possible to reduce connection loss with a conventional type fiber.

Example 3

Figure 12:
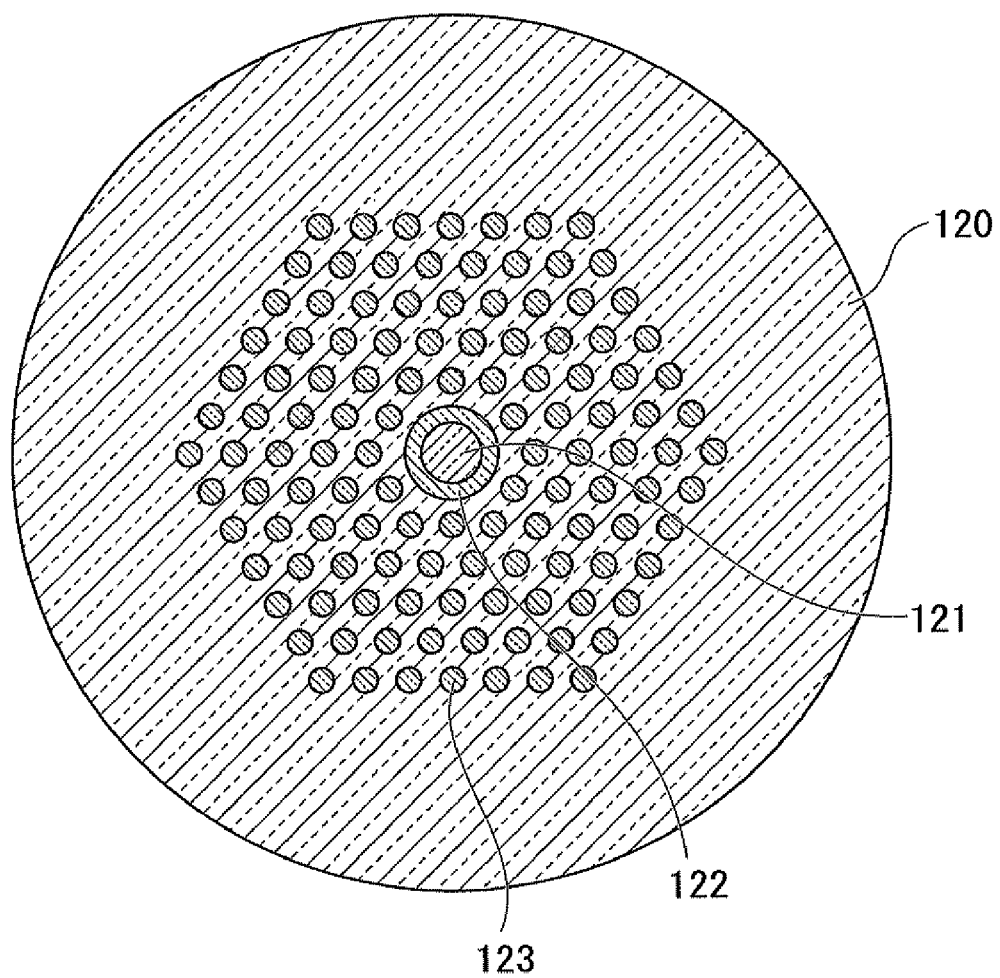
FIG. 12 is a cross sectional view of a photonic band-gap fiber produced in Example 3.

In another example according to the present invention, a photonic band-gap fiber having a structure shown in FIG. 12 was produced. A clad glass rod 120 made of pure silica glass had a refractive index of 1.45. The first core 121 having a diameter d1 of 29.0 µm and a relative refractive index difference Δ1 of 0.0% was disposed inside the clad 120. The second core 122 having a diameter d2 of 35.0 µm and a relative refractive index difference Δ2 from the clad 10 of −3.6% existed around the first core 121. The high refractive index portions 123 each having a diameter dh of 5.8 µm and a relative refractive index difference Δh from the clad of 1.6% were arranged around the second core 122 so as to form a periodic structure of a triangular lattice with a periodic interval of 14.5 µm. The triangular lattice lacked two layers from the center so as to dispose the core, and formed a five layered periodic structure.

Figure 13:
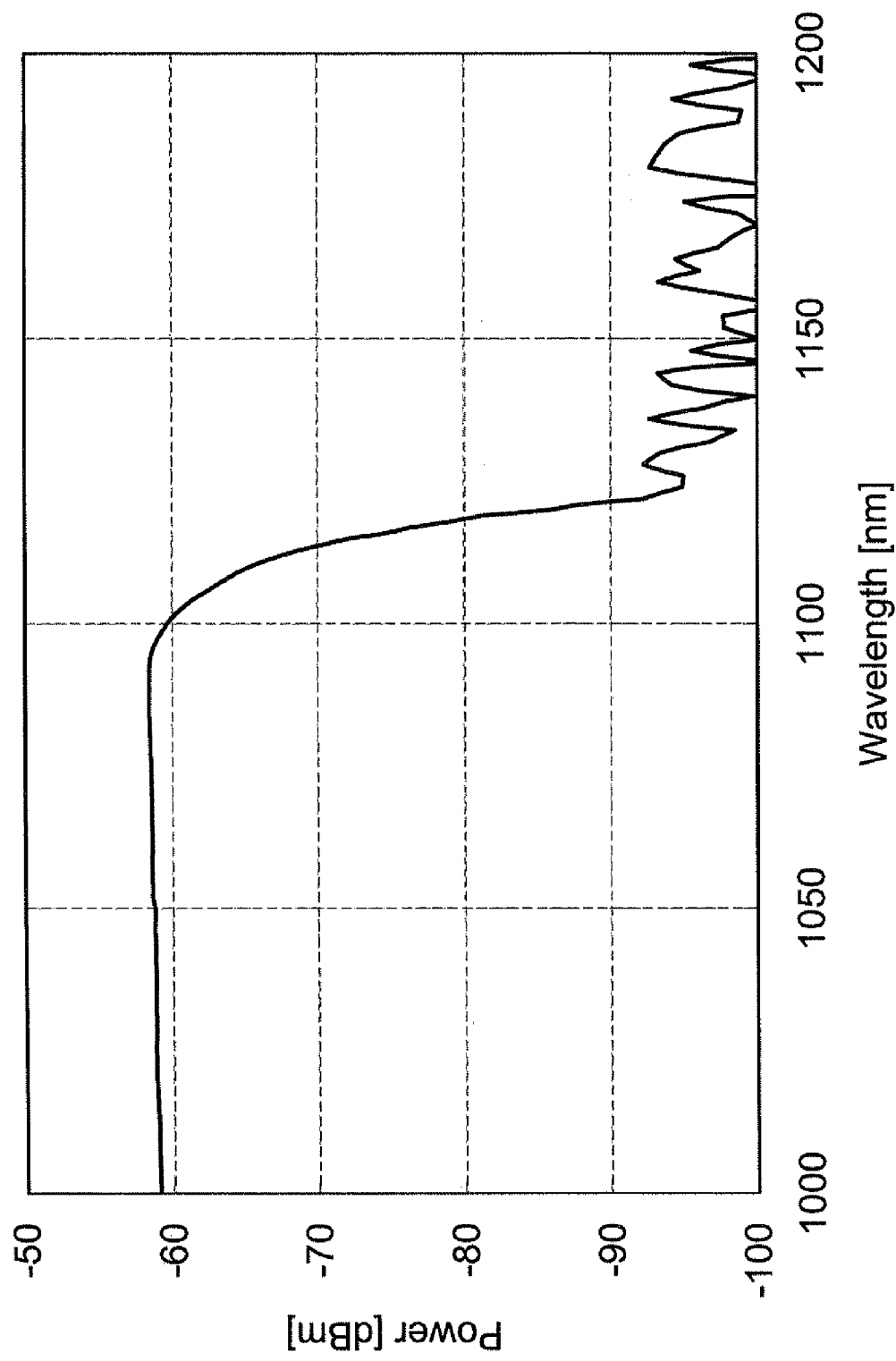
FIG. 13 is a graph showing the results of measurement of a transmission band of the photonic band-gap fiber produced in Example 3.

From the thus produced fiber, a 2 m length of fiber was extracted. Under a wound state of the fiber in a coil diameter of 280 mmφ, only a core portion was excited by white light, and the transmission band was measured. The result is shown in FIG. 13.

As shown in the figure, the strength of the transmission light steeply decreases near a wavelength of 1.13 µm. Therefore, when an incident laser light has a wavelength of 1.08 µm, it is possible to suppress a first-order stimulated Raman scattering at a wavelength of around 1.14 µm.

Example 4

Figure 14:
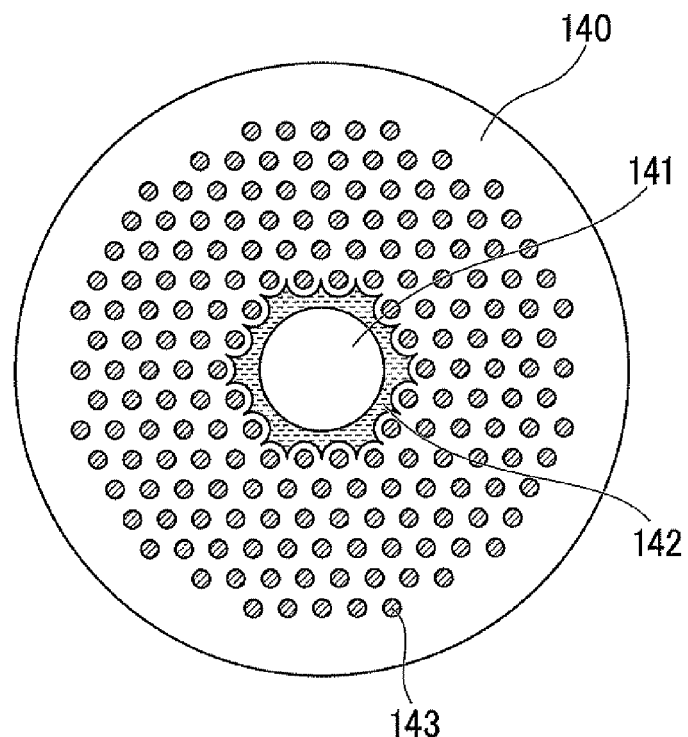
FIG. 14 is a cross sectional view of a photonic band-gap fiber produced in Example 4.

As another embodiment according to the present invention, a photonic band-gap fiber having a structure shown in FIG. 14 was produced. A clad 140 was a glass rod made of pure silica glass having a refractive index of 1.45. A first core 141 having a diameter d1 of 28.6 µm and a relative refractive index difference Δ1 from the clad 140 of 0.0% was disposed inside the clad 140. The second core 142 was disposed in the periphery of the first core 141. The second core had a relative refractive index difference Δ2 from the clad 140 of −0.15%, and had d2 of 34.4 μm as a diameter of circle inscribing the clad surrounding the core. High refractive index portions 143 were disposed around the second core 142 so as to form a triangular lattice structure with a periodic interval of 8.1 μm, wherein each of the high refractive index portions 143 has a radius of 5.1 μm and a substantially parabolic shaped distribution of refractive index where a maximum value of the refractive index difference Δh from the clad 140 was 2.8%. The periodic structure lacks three layers from the centre so as to dispose the core, and forms a five or six layered periodic structure. The outer diameter of the fiber was 215 μm.

In the production of a base material, circumferential members constituting the periodic structure portion were disposed periodically in the tube constituting the clad 140, and a core member constituting the first core 140 and the second core 142 was disposed in the center. At that time, since the diameter of the core member was different from that of the circumferential member, interstitial spaces were formed between the core member and the circumferential members. If the drawing is performed under the presence of the interstitial spaces, undesirable deformation of the core or disorder of the periodic structure may occur during drawing to integrate the different members.

Figure 15:
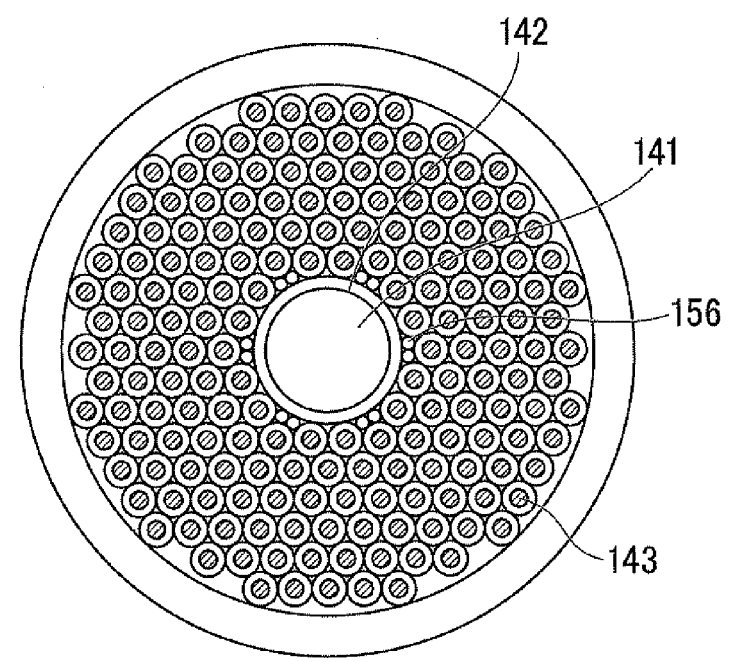
FIG. 15 is a graph showing a cross sectional view of a photonic band-gap fiber produced in Example 4.

Therefore, as shown in FIG. 15, by further disposing an intermediate member 156 between the core member and the circumferential members, it is possible to inhibit the deformation of the core and disorder of the periodic structure. Where the refractive index of the intermediate member 156 is equal to or higher than the refractive index of the first core 141, it is sometimes undesirable since there is a possibility that mode coupling occurs between the mode guided in the core and the mode guided in the portion corresponding to the intermediate member, causing a loss of core mode in the transmission band formed by the effect of the photonic band gap.

In the present embodiment, generation of unnecessary loss caused by mode coupling in the transmission band formed by the effect of the photonic band gap is inhibited by controlling the refractive index of the intermediate member 156 to be similar to a refractive index of the second core 142. However, the refractive index of the intermediate member 156 is not limited to the embodiment of the present example, and can be modified within a range lower than the refractive index of the first core 141.

Figure 16:
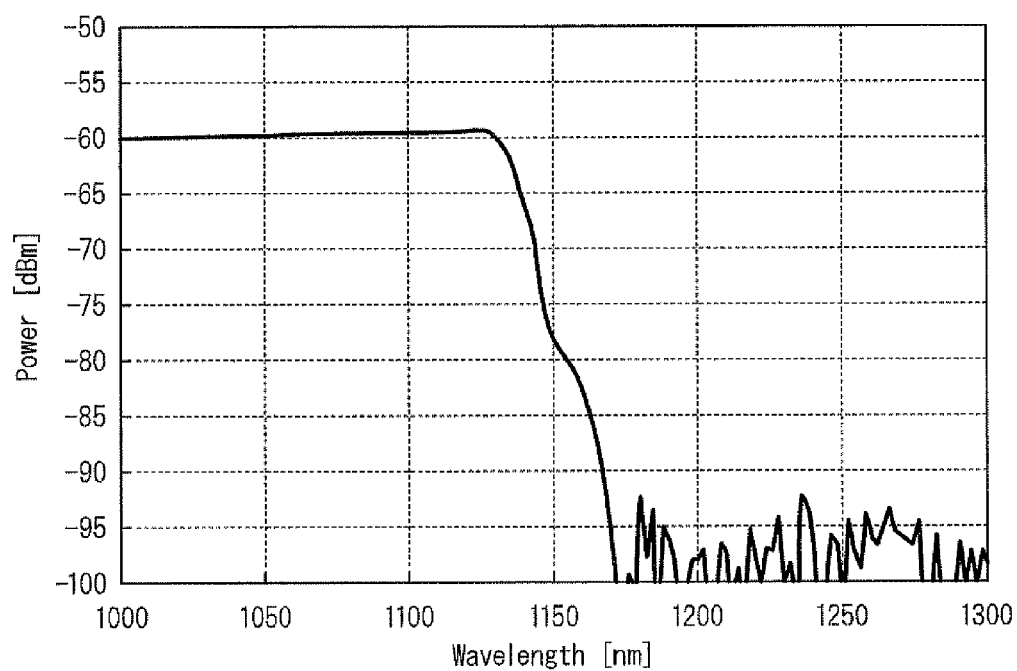
FIG. 16 is a graph showing the results of measurement of transmission band of a photonic band-gap fiber produced in Example 4.

From the thus produced fiber, a 2 m length of fiber was extracted. Under a wound state of the fiber having a coil diameter of 280 mmφ, only a fundamental mode was selectively excited by a white light, and transmission band was measured. The result is shown in FIG. 16. As shown in FIG. 16, strength of the transmission steeply decreases near the wavelength of 1.13 μm. Therefore, when the laser light having a wavelength of 1.08 μm is inputted in the fiber, it is possible to suppress a first order stimulated Raman scattering around the wavelength of 1.14 μm.

Next, a 6 m length of fiber was extracted. A light from a pulse fiber laser for processing having a center weave-length of 1.08 μm, a peak power of 18 kW, and an average power of 30 W was guided by the fiber to a work to be processed. By the wavelength filtering effect of the photonic band-gap fiber of the present embodiment, stimulated Raman scattering was not generated at a wavelength of 1.14 μm. High powered light outgone from the main body of the pulse fiber laser for processing could be guided stably to the work without suffering an influence of change in wavelength spectrum caused by stimulated Raman scattering.

In a photonic band-gap fiber having high refractive index portions with relative refractive index difference Δh of about 1%, there was a problem of reduction of transmission band caused by bending loss of the fiber. In the photonic band-gap fiber of the present embodiment, the relative refractive index difference Δh of the high-index portion has a large value of at most 2.8%. Therefore, even when bending of a diameter of about 50 mm was made on the fiber for guiding the laser light to the work, reduction of transmission band caused by the bending loss was sufficiently decreased, and the light was stably guided to the work.

Example 5

Spinned Double Clad Fiber

Figure 17:
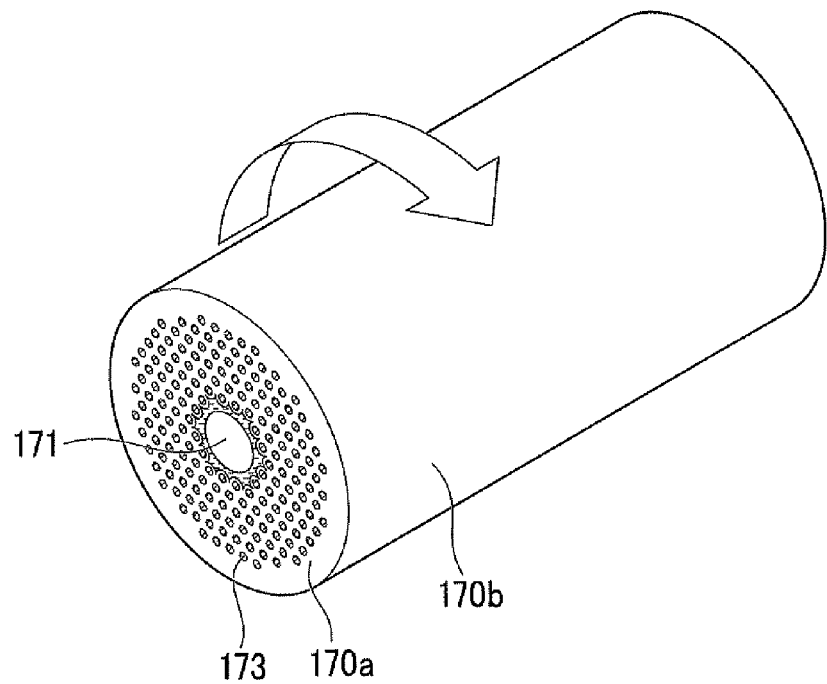
FIG. 17 is a strabismic cross sectional view of a photonic band-gap fiber produced in Example 5.

FIG. 17 is a drawing showing the structure of a fiber of another example according to the present invention. While the structure of the cross section of the fiber of the present embodiment is similar to the fiber of Example 4, the fiber is constituted as an amplification fiber, wherein the first core 171 was doped with ytterbium, and a periphery of the clad 170a was covered by a second clad 170b composed of a fluororesin having a refractive index of 1.38. Here, since the first core 171 is doped with ytterbium, the first core has a relative index difference of 0.05% compared with pure silica. In addition, during the fiber drawing process, the fiber of a fused state was twisted. As a result, the high refractive index portions 173 were constituted to have a helical configuration, and substantially bent in the lengthwise direction. Therefore, the light propagating in the high refractive index portions generates loss such as macro-bent loss and micro-bent loss. On the other hand, since the first core 171 is placed in the center of the fiber cross section, bending of the first core in the lengthwise direction does not occur.

In the fiber of the present example, the refractive index of the first core 171 is slightly larger than that of the clad 170a. However, since the relative refractive index difference has only a slight value of 0.05%, the fiber of the present example has substantially similar transmission property and cut-off property as those of Example 4. Therefore, when the fiber of the present example is used as a fiber for amplifying the laser light of 1.08 μm in wavelength, it is possible to suppress the first order stimulated Raman scattering at a wavelength of around 1.08 μm.

The fiber of the present example can be used preferably as a double clad structured fiber for amplifier. If the fiber is not twisted, a problematic phenomenon occurs when the fiber is used as a double clad structure fiber for amplifier. That is, an pump light excited in the clad 170a is guided in the high refractive index portion 173 and is not used for amplifying the signal light, thereby decreasing the utilization ratio of exited light in the amplifier. However, if the photonic band-gap fiber of the present example is used, the pump light guided in the high refractive index portion 173 is radiated from the high refractive index portion 173 by losses such as macro-bend loss and micro-bend loss, absorbed by the core, and is reused in the amplification of the signal light. Therefore, when the photonic band-gap fiber of the present example is used in the double clad structured fiber for amplifier, it is possible to enhance the utilization ratio of pump light in the amplifier.

The fiber of example 5 is subjected to substantially sine-wave shaped twisting having a period P of twist of 1 cm and a maximum angle A of twist of 20π radian, The sine-wave shaped twisting denotes a twisting in which an angle of twist Θ(z) of the fiber at a distance Z in the lengthwise direction of the fiber is expressed as a function of a period P of twist and the maximum angle A of the fiber by the following equation, $$\Theta(z)=A\times\sin(2\pi\times Z/P).$$

In Example 5, the fiber is rotated 3 times by the twisting within the fiber length of 0.25 cm. It is very difficult to apply such a degree of twisting after a solidification of the fiber.

When the whole area of the clad of the fiber of Example 5 was excited by a light of 915 nm in wavelength, the amount of absorption by the ytterbium doped in the core was 0.4 dB/m. In addition, the pump light incident to the high refractive index portion 173 was radiated to the clad by bend loss and subsequently absorbed by ytterbium doped in the core. As a result, residual pump light in the high refractive index portion 173 was not observed. In addition, when the fiber was used as a fiber for amplifying the laser light of 1.08 μm in wavelength, it was possible to suppress the first order stimulated Raman scattering of light of wavelength around 1.14 μm.

Non-patent reference (J. D. Love et al., Radiation from single-mode helical fibers, Electronics letters, vol. 23, No. 21, pp 1109-1110, 1987) describes an optical loss in a fiber having a helical configuration of a core along its lengthwise direction, and can be used as a guide line to know the degree of twisting required for the loss of light leaked to high refractive index portion 173 in the photonic band-gap fiber of Example 4. Actually, the loss is different depending on the shape of the core, order of the mode, and radius of the helix. The non-patent reference shows that a twisting of about 1 rotation per 5 mm is required for obtaining a loss of 1 dB/m or less within a range of refractive index distribution which can be realized by a general silica-based optical fiber. While the fiber is twisted in a single direction in the above non patent reference, even when the twisting has a sine-wave shape or other shapes, the light leaked to the high refractive index portion 173 suffers loss provided that at least one rotation per about 5 mm is applied to the fiber by the twisting. In addition, it is possible to increase the loss of light leaked to the high refractive index portion 173 in accordance with the increased degree of twisting.

Example 6

Polarization Maintaining Fiber

Figure 18A:
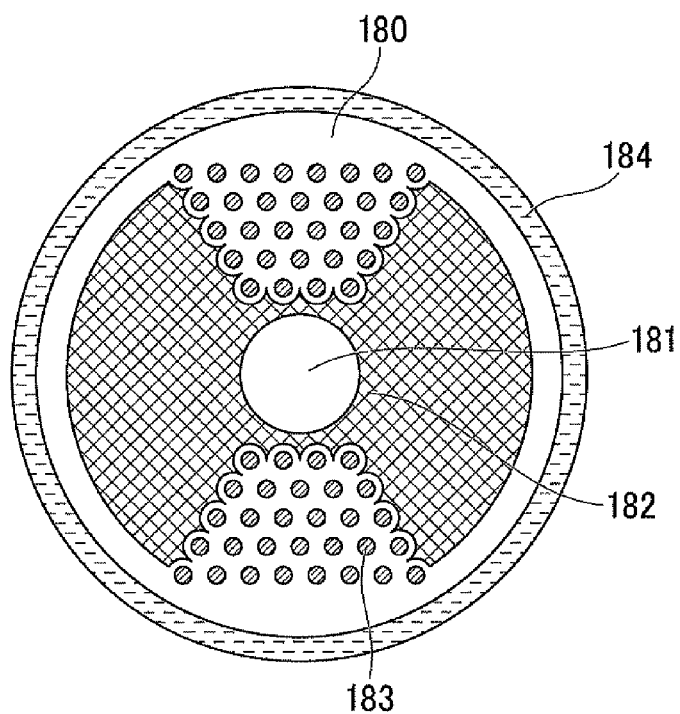
FIG. 18A is a cross-sectional view of a photonic band-gap fiber produced in Example 6.

As the other example according to the present invention, a photonic band-gap fiber having a structure shown in FIG. 18A was produced. Clad 180 was made of pure silica glass having a refractive index of 1.45. The first core 181 having a diameter d1 of 28.6 μm and a relative refractive index difference Δ1 from the clad 180 of 0.0% was disposed inside the clad 180. The second core 182, in which fluorine was doped in the pure silica, was disposed around the second core 182. The second core had a relative refractive index difference Δ2 from the clad 180 of −0.15% and d2 of 34.4 μm as the diameter of a circle inscribing the clad surrounding the core. A periodic structure was disposed in an arrangement of two-fold rotation symmetry around the second core 182. The periodic structure had low refractive index portions made of fluorine doped pure silica having a refractive index similar to the second core 182 and high refractive index portions 183 made of germanium doped pure silica. The fiber had an outer diameter of 215 μm.

In the configuration of the periodic structure, high refractive index portions 183 were disposed forming a triangular lattice structure with a periodic interval of 8.1 μm, wherein each of the high refractive index portions 183 had a radius of 5.1 μm and a substantially parabolic shaped distribution of refractive index where the maximum value of the refractive index difference Δh from the clad was 2.8%. The periodic structure lacks three layers from the centre so as to dispose the core, and forms a five layered periodic structure.

The periodic structure portion is made of pure silica doped with germanium and has a largely different thermal expansion coefficient from those of clad 180 made of pure silica and the low refractive index portion made of pure silica doped with fluorine. Therefore, if the cross section has a rotation symmetry of 2 fold or less as shown in FIG. 18A, birefringence is generated by thermal stress. Therefore, it is possible to make the fiber function as a polarization maintaining fiber without providing an additional stress-applying portion. When the birefringence of the fundamental mode of the thus produced fiber was measured, the fiber had a birefringence of $1\times10^{-4}$ or more at a wavelength of 1.08 μm and could function as a polarization maintaining fiber. In addition, the fiber also had a wavelength filtering effect due to the effect of the photonic band-gap.

The first core 181 of the fiber of the present invention has a circular section. Since the distribution of the electric filed is mainly dominated by the shape of the first core 181, the electric field has a concentric distribution, mode birefringence is not generated, and only stress-originated birefringence is generated. Further, when the fiber is connected to a conventional type optical fiber having a concentric circle shaped distribution of electric field, it is possible to reduce a connection loss due to the difference in the shape of mode-field, thereby enabling connection with a conventional-type fiber at low connection loss.

Figure 18B:
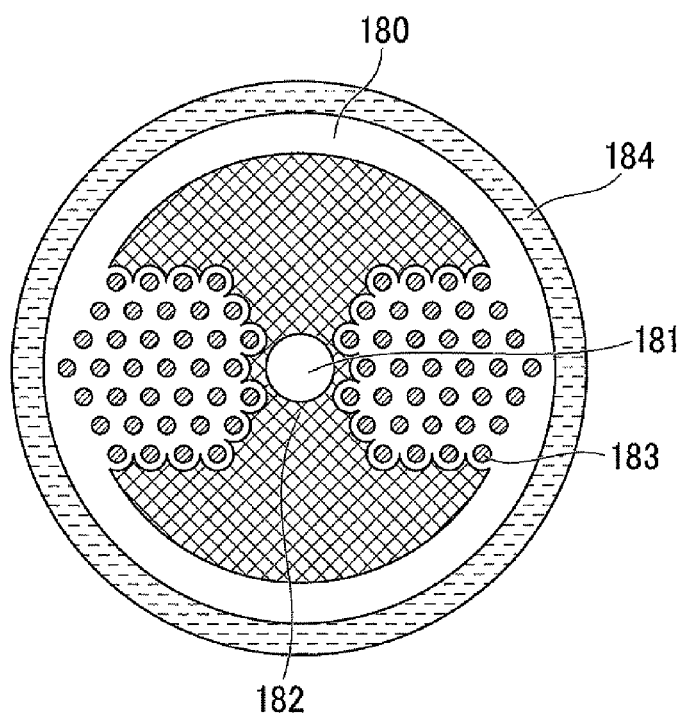
FIG. 18B is a cross-sectional view of a photonic band-gap fiber produced in Example 6.
Figure 18C:
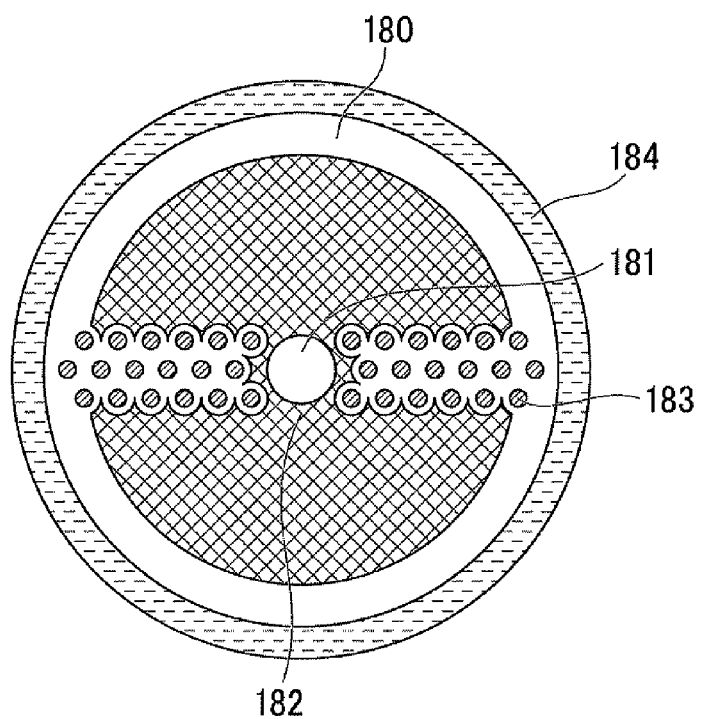
FIG. 18C is a cross-sectional view of a photonic band-gap fiber produced in Example 6.
Figure 18D:
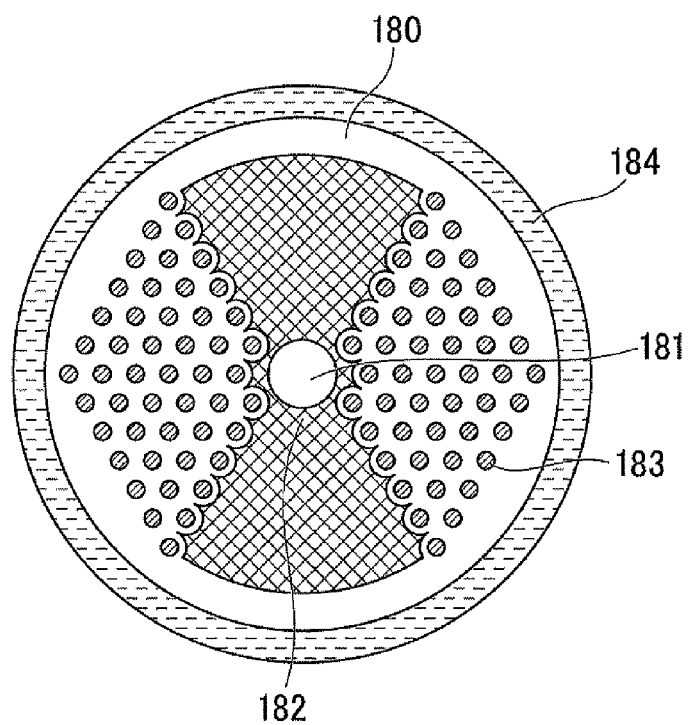
FIG. 18D is a cross-sectional view of a photonic band-gap fiber produced in Example 6.

A photonic band-gap fiber of the present invention is not limited to the present example. Various configuration is allowed as shown in FIG. 18B, FIG. 18C, FIG. 18D provided that a high refractive index portion 183 that generates birefringence in the core by thermal stress is disposed at a rotational symmetry of 2 fold or less.

Figure 18E:
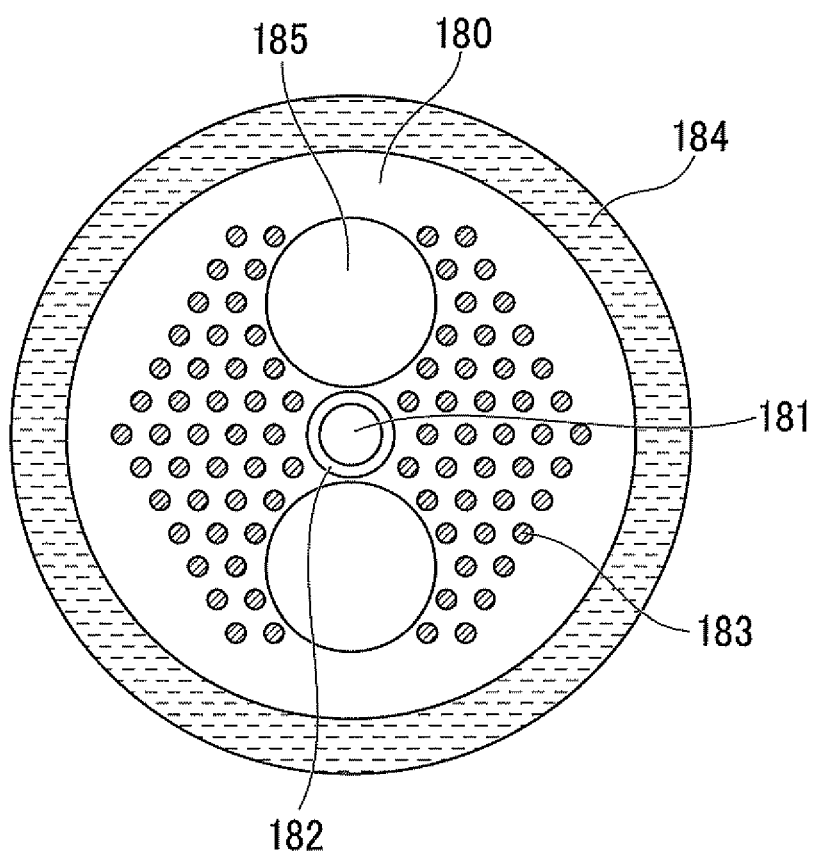
FIG. 18E is a cross-sectional view of a photonic band-gap fiber produced in Example 6.

In general, silica glass doped with boron is used as a stress-applying member for forming a polarization maintaining fiber in the silica glass fiber. Therefore, it is possible to consider a configuration in which a stress applying portion 185 is additionally provided as shown in FIG. 18E. Since the refractive index of the fluorine doped pure silica is lower than that of the pure silica, it is necessary to provides the stress-applying portion separately from the high refractive index portion 183. Therefore, it is necessary to arrange the high refractive index portions 183 appropriately, thereby decreasing the degree of freedom of design. Further, in a structure as shown in FIG. 18E, if a large amount of germanium is doped such that the high refractive index portion 183 had a refractive index difference of 1.5% or more, thermal stress caused by the high refractive index portion 183 and thermal stress caused by the separately disposed stress applying portions balance each other. As a result, there is a case of the birefringence being reduced or not being generated. Therefore, where a specifically large thermal stress is caused by the high refractive index portions 183, it is more preferable to generate the birefringence only by the thermal stress by the high refractive index portions 183 without separately providing a stress-applying portion.

Example 7

Fiber Written with a Fiber Grating

The fiber of the present example has the same cross section as Example 4. The fiber is constituted of a fiber for amplification having double-clad structure, in which the first core is doped with ytterbium, and the periphery of the clad is covered by the second clad made of fluoric resin having a refractive index of 1.38. A long-period fiber grating is written on the high refractive index portion. Thus the fiber is constituted such that the pump light guided in the high refractive index portion is partially radiated from the high refractive index portion when the pump light is introduced by the clad excitation.

Figure 19A:
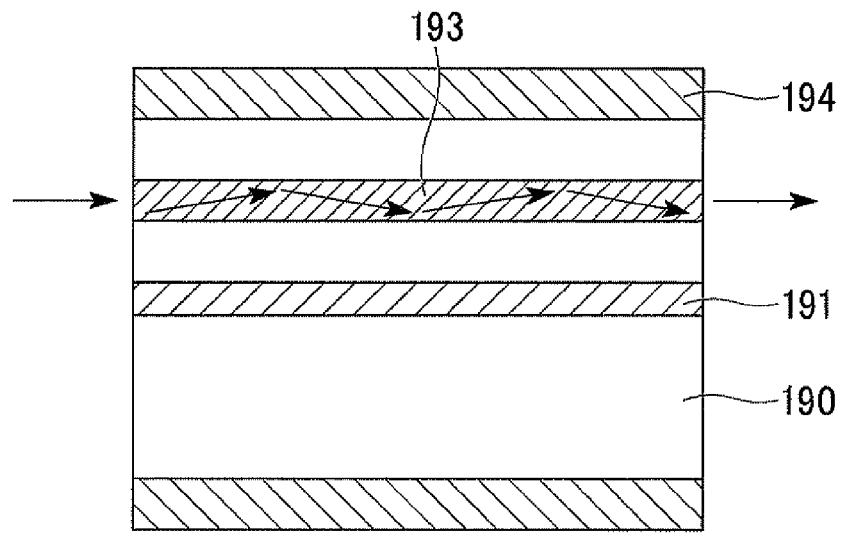
FIG. 19A is a graph schematically illustrating propagation of pump light on a lengthwise cross section of a photonic band-gap fiber produced in Example 7.
Figure 19B:
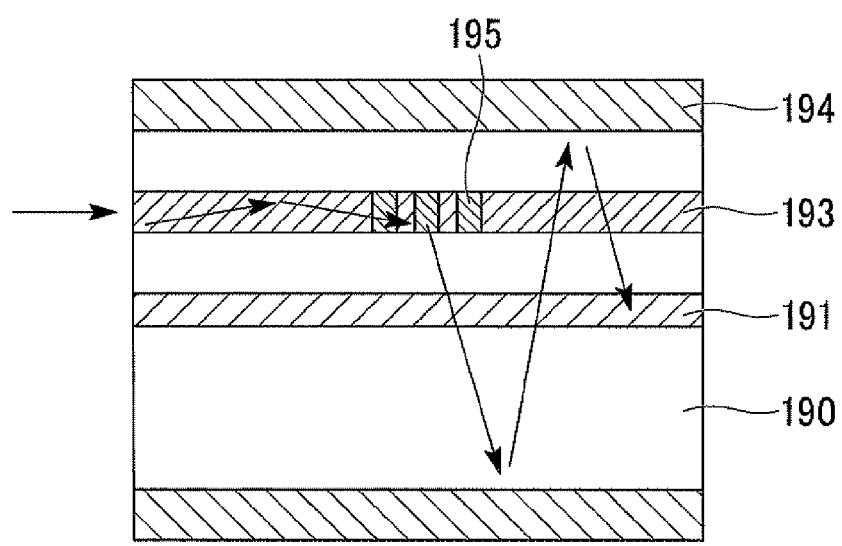
FIG. 19B is a graph schematically illustrating propagation of pump light on a lengthwise cross section of a photonic band-gap fiber produced in Example 7.

The fiber of the present example may be preferably used as a double-clad structured fiber for amplifier. If the long-period fiber grating is not written in the high refractive index portion, a problematic phenomenon occurs when the fiber is used as a double clad structure fiber for an amplifier. That is, as shown in FIG. 19A, pump light excited in the clad is partially guided in the high refractive index portion 193 and does not reach the first core, thereby being not used for amplification of signal light. As a result, the utilization ratio of pump light in the amplifier is deteriorated. However, if the photonic band-gap fiber of the present example is used, as shown in FIG. 19B, the pump light guided in the high refractive index portion is radiated from the high refractive index portion 193 by the long period fiber grating, and is coupled with another guide mode guided by the difference in refractive index between the clad 190 and the second clad 194, and is subsequently absorbed by the core and used in amplification of the signal light. Therefore, by using the photonic band-gap fiber as a fiber having a double clad structure for amplifier, it is possible to enhance the utilization ratio of pump light in the amplifier.

Figure 19C:
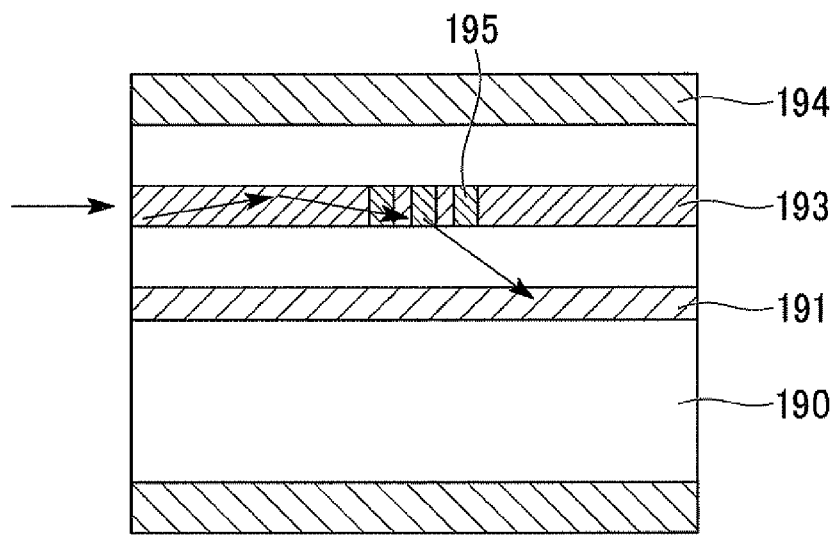
FIG. 19C is a graph schematically illustrating propagation of pump light on a lengthwise cross section of a photonic band-gap fiber produced in Example 7.

It is preferable that the guide mode guided in the high refractive index portion 193 has an effective refractive index which is smaller than the refractive index of the clad 190a and larger than the refractive index of the second clad 194. In this case, since the effective refractive index is smaller than the clad 190, the guide mode is not confined in the high refractive index portion. In addition, since the effective refractive index is larger than the clad 194, the guide mode can propagate in the second clad 194. Therefore, it is possible to make the pump light reach the core effectively. More preferably, as shown in FIG. 19C, by making the guide mode to be coupled with the mode propagating in the core, it is possible to make the pump light reach the core more effectively.

Figure 19D:
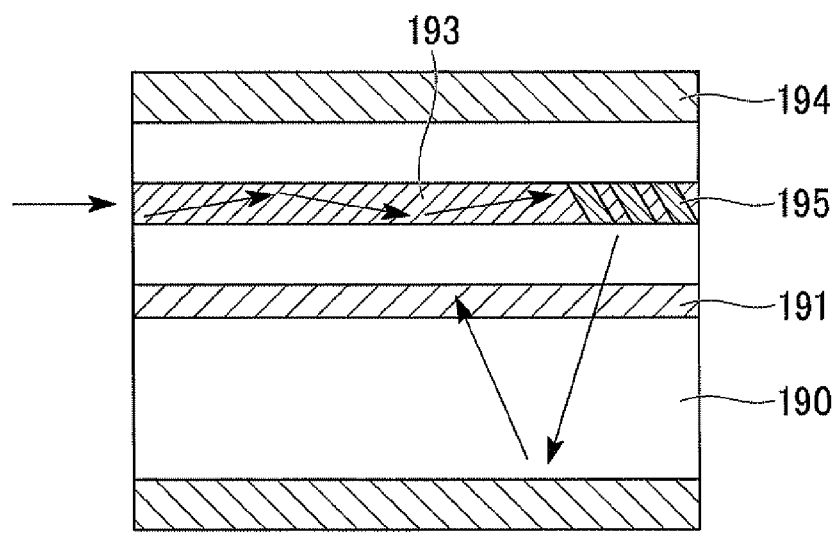
FIG. 19D is a graph schematically illustrating propagation of pump light on a lengthwise cross section of a photonic band-gap fiber produced in Example 7.

Although a long period fiber grating was used in the present example, any fiber grating is acceptable provided that the fiber grating can radiate the pump light guided in the high refractive index portion 193 to the outside the high refractive index portion 193 and makes the light to be coupled with another guide mode. For example, as shown in FIG. 19D, it is possible to radiate the light to a direction opposite the direction of the propagation direction of the pump light using a slanted fiber grating. In this case, it is possible to have the light be coupled with the mode that propagates in the core in the opposite direction, thereby making the pump light to reach the core effectively.

In the photonic band-gap fiber of the present invention, an pump light is newly introduced in the clad at a portion where the pump light is radiated to the clad by the fiber grating. Therefore, by optimizing the lengthwise positions of fiber grating to be written, it is possible to optimize the lengthwise distribution of the pump light in the fiber used for signal amplification.

Where the long period fiber grating is used, the pump light radiated from the high refractive index portion propagates in the same direction as its propagation direction in the high refractive index portion. Therefore, for example, it is preferable to write the fiber grating in the positions to ensure a sufficient fiber length to sufficiently absorb the radiated pump light by the core.

Where a slanted fiber grating is used, the pump light radiated from the high refractive index portion propagates in the reverse direction with respect to the propagation direction of the light in the high refractive index portion. As a result, for example, by writing the fiber grating on the end surface opposite to the end surface to which the pump light is incident, pump light is partially introduced from the end surface opposite to the incident surface of the pump light, thereby homogenizing the lengthwise distribution of the pump light in the amplifier. Therefore, the case is preferable.

INDUSTRIAL APPLICABILITY

By providing a periodic structure around the first, and the second core, it is possible to make the photonic band-gap fiber of the present invention to function as a wavelength filter. As a result, it is possible to decrease the propagation loss of transmission wavelength and increase the propagation loss of cutoff wavelength, thereby obtaining a high wavelength filtering effect at the cutoff wavelength.

The inventioned claimed is:
1. A photonic band-gap fiber comprising:
   a first core having a refractive index that is not higher than a refractive index of a clad;
   a second core that is disposed so as to surround the first core and has a refractive index that is lower than the refractive index of the first core;
   a clad that surrounds the second core; and
   a periodic structure portion that is disposed in the clad in a vicinity of the second core,
   wherein the periodic structure portion is constituted by high-refractive index portions that have a refractive index higher than that of the clad and form the periodic structure, and the periodic-structure portion functions as a wavelength filter.

2. A photonic band-gap fiber comprising:
   a first core having a refractive index of 0% to 0.1% in relative refractive index difference from the refractive index of the clad;
   a second core that is disposed so as to surround the first core and has a refractive index that is lower than a refractive index of the first core;
   a clad that surrounds the second core; and
   a periodic structure portion that is disposed in the clad in a vicinity of the second core,
   wherein the periodic structure portion is constituted by high-refractive index portions that have a refractive index higher than that of clad and form the periodic structure, and the periodic-structure portion functions as a wavelength filter.

3. The photonic band-gap fiber according to claims 1 or 2, wherein the periodic structure has a rotation symmetry of 2 fold or less, and the photonic band-gap fiber functions as a polarization maintaining fiber or a single polarization fiber.

4. The photonic band gap fiber according to claims 1 or 2, wherein a plurality of the high refractive index portions are arranged in the periodic structure so as to include at least any one selected from a triangular lattice structure, a honeycomb lattice structure, square lattice structure, and rectangular lattice structure.

5. The photonic band-gap fiber according to claims 1 or 2, wherein a cross section of the first core has a circular shape.

6. The photonic band-gap fiber according to claims 1 or 2, wherein a void does not exist in the first core and the second core.

7. The photonic band-gap fiber according to claims 1 or 2, wherein the relative refractive index difference of the first core from the clad is within a range of 0.1% to −1.0%, and the relative refractive index difference of the second core from the clad is within a range of −0.01 to −1.5%.

8. The photonic band-gap fiber according to claims 1 or 2, wherein the maximum refractive index difference of the high refractive index portion from the clad is within a range of 0.5% to 4.0%.

9. The photonic band-gap fiber according to claims 1 or 2, wherein the clad is surrounded by a medium that has a refractive index lower than that of the clad.

10. The photonic band-gap fiber according to claim 1 or 2, wherein the periodic structure is arranged in a helical configuration around the first core as the center axis.

11. The photonic band-gap fiber according to claims 1 or 2, wherein a fiber grating is formed at least in a partial portion of the periodic structure such that a refractive index is modulated in the lengthwise direction of the fiber.

* * * * *